United States Patent
Jarvis et al.

(10) Patent No.: US 10,453,319 B2
(45) Date of Patent: Oct. 22, 2019

(54) METHODS AND APPARATUS FOR MANAGEMENT OF INTRUSION DETECTION SYSTEMS USING VERIFIED IDENTITY

(71) Applicant: SENSORMATIC ELECTRONICS, LLC, Boca Raton, FL (US)

(72) Inventors: Graeme Jarvis, Marblehead, MA (US); Terezinha Rumble, Jensen Beach, FL (US); George C. Grammer, West Palm Beach, FL (US); Michael Lamarca, Parker, CO (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 15/911,613

(22) Filed: Mar. 5, 2018

(65) Prior Publication Data
US 2019/0096210 A1   Mar. 28, 2019

Related U.S. Application Data

(60) Provisional application No. 62/561,743, filed on Sep. 22, 2017.

(51) Int. Cl.
*G08B 13/24* (2006.01)
*G06Q 10/06* (2012.01)
*G07C 9/00* (2006.01)

(52) U.S. Cl.
CPC ......... *G08B 13/2491* (2013.01); *G06Q 10/06* (2013.01); *G07C 9/00087* (2013.01); *G07C 9/00119* (2013.01); *G07C 2009/00095* (2013.01)

(58) Field of Classification Search
CPC ............ G08B 13/2491; G07C 9/00087; G07C 9/00119
USPC ......................................................... 340/541
See application file for complete search history.

(56) References Cited

U.S. PATENT DOCUMENTS

| 5,743,349 A | 4/1998 | Steinberg | |
| 8,344,850 B2* | 1/2013 | Girard, III | H04L 63/102 307/10.2 |
| 9,589,405 B2* | 3/2017 | Cabouli | G06F 21/32 |
| 2014/0090036 A1* | 3/2014 | Roberts | H04L 63/0884 726/6 |
| 2014/0091903 A1* | 4/2014 | Birkel | B60R 25/24 340/5.54 |
| 2016/0189528 A1* | 6/2016 | Lee | G08B 25/008 340/541 |
| 2018/0041860 A1 | 2/2018 | England | |
| 2018/0072416 A1 | 3/2018 | Cantrell et al. | |
| 2018/0194323 A1* | 7/2018 | Woodill, Jr. | G07C 9/00 |

OTHER PUBLICATIONS

Office Action for U.S. Appl. No. 15/911,512, dated Oct. 3, 2018, 9 pages.

* cited by examiner

*Primary Examiner* — Kerri L McNally
(74) *Attorney, Agent, or Firm* — Foley & Lardner LLP

(57) ABSTRACT

Disclosed are techniques for configuring an intrusion detection system, by receiving from a user device, a set of identity credentials, sending the set of identity credentials to an identity service to verify a user's identity that is associated with the set of credentials, receiving a result of the verification of the identity; and when verified, configuring the intrusion detection system to operate in a mode pre-selected based on the verified identity.

17 Claims, 18 Drawing Sheets

METHODS AND APPARATUS FOR MANAGEMENT OF INTRUSION DETECTION SYSTEMS USING VERIFIED IDENTITY

CLAIM OF PRIORITY

This application claims priority under 35 U.S.C. § 119(e) to provisional U.S. Patent Application 62/561,743, filed on Sep. 22, 2017, entitled: "Methods and Apparatus for Implementing Identity and Access Management," the entire contents of which are hereby incorporated by reference.

BACKGROUND

This description relates to operation of intrusion detection systems for detecting physical intrusion into physical facilities.

Intrusion detection systems are widely deployed in commercial businesses and residential settings. Intrusion detection systems typically include plural sensors that provide data indicating presence of moving objects within a facility or perimeter intrusions into such facilities, etc.

It is common for computer systems to gather information, such as proprietary data on individuals other entities such as businesses etc., as well on operational data from other systems. One type of information is proprietary data such as "personally identifiable information" commonly referred to as "PII." PII is information of a sensitive, personal nature that is generally associated with individuals and is often protected by privacy laws in many jurisdictions. PII is information that can identify or contact or locate a single person or to identify an individual in context. Examples of PII include name, social security number, date and place of birth, mother's maiden name, biometric records and information that is linkable to an individual, such as medical, educational, financial, and employment information, as well as a user's device IP address used in a communication service broker.

Another type of information is proprietary data such as Machine Identifiable Information or "MII," such as in the context of the "Internet of Things." That is, other information that is collected includes operational information such as information used to control access control systems, intrusion detection systems and integrated security/alarm systems. For different reasons each of these types of information may have a sensitive nature that should limit the ubiquitous retention of such information in disparate systems.

Presently, intrusion systems are turned off and turned on by authorized person(s) of a premises being protected. In this manner, the system is only protecting the premises when the system is turned on by the authorized person(s).

SUMMARY

The techniques described herein provide a higher level of identity validation that will be required as intrusion detection system architectures are expanded to encompass a greater range of functionality. The described architecture provides validation for intrusion detection systems of the person who is in possession of credentials on a card, e.g., an identity wallet with PII or other such unique characteristics, e.g. biometrics, as opposed to merely validating the access card itself as is now typically conventionally done.

According to an aspect, a method includes configuring an intrusion detection system, by receiving from a user device, a set of identity credentials, sending the set of identity credentials to an identity service to verify a user's identity that is associated with the set of credentials, receiving a result of the verification of the identity; and when verified, configuring the intrusion detection system to operate in a mode pre-selected based on the verified identity.

Aspects also include computer program products and methods. Additional features of the computer program product, systems and methods include other features disclosed herein.

One or more of the above aspects may provide one or more of the following advantages.

In some implementations, these aspects enable user devices to transmit PII (and other confidential information) without that information being hosted by third party (requesting systems) that would otherwise manage and store such PII (and other confidential information). In other implementations information can be hosted by third party systems or such information can be held by third party systems for attestation purposes, e.g., a registry such as a motor vehicle registry. Currently third party requester systems are ubiquitous, but the techniques currently employed make such information vulnerable to improper access and disclosure through various types of hacking attacks on any of the ubiquitous numbers of third party requester systems.

The disclosed techniques including a security application that in conjunction with the distributed ledgers can send to user devices containing a wallet a verification or a verification error depending on the outcome of processing. Credentials are presented to the intrusion detection system that allows the system to validate a registered user's identity that allows the intrusion system to be configured various modes according to whether the verified resident arrives and in a different mode when they leave and thus change its mode of operation based on who is present.

All exchanges are logged in the distributed ledger for audit tracking, etc. and verification of information can be used with information in the distributed ledger. Records are added to the distributed ledger as transactions and include a hashed record of the transaction, what was exchanged, the signatures of the parties, and may include additional detailed information depending on the type of distributed ledger used.

The details of one or more embodiments of the invention are set forth in the accompanying drawings and the description below. Other features, objects, and advantages of the invention is apparent from the description and drawings, and from the claims.

DETAILED DESCRIPTION

Described herein is use of an IAM system (Identity and Access Management) for identity verification used in conjunction with an intrusion detection system. The IAM system includes a set of techniques that provide a solution using a private service broker for dissemination of information such as PII (as well as other confidential information) between two or more electronic devices. The dissemination of information occurs in a controlled, secure and confidential manner. Also described is a mechanism that allows for the verification of information including PII (as well as other confidential information), and credentials, without the actual disclosure of the PII (as well as other confidential information).

The identity verification system described uses a combination of an identity wallet that executes on a user device, a distributed ledger that manages proxies for PII (as well as other confidential information), along with a service broker system that securely manages data transmissions and verifications of the data without actually having the wallet directly access the distributed ledger. In some implementations the service broker is not needed.

Figure 1:
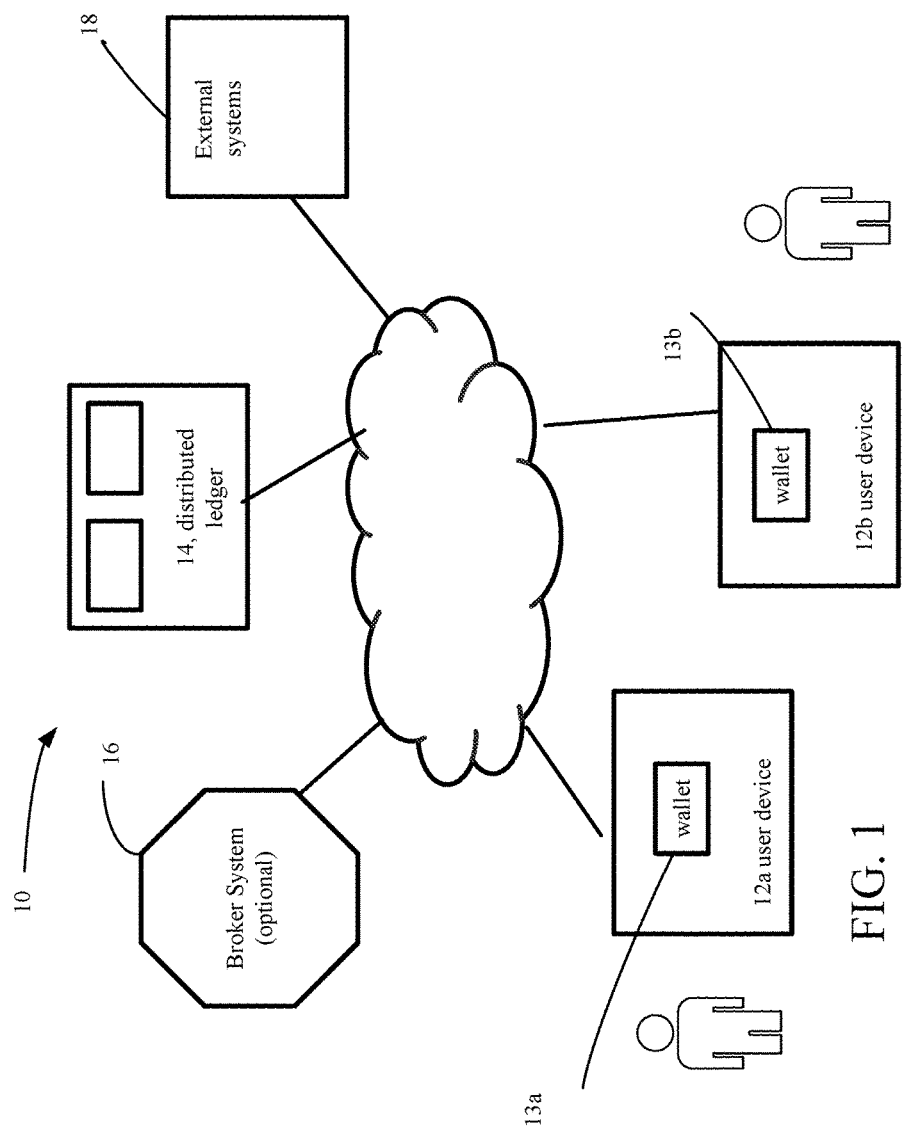
FIG. 1 is a schematic diagram of an exemplary system for securing PII information.

Referring now to FIG. 1, an exemplary distributed network IAM system 10 (system 10) for identity verification is shown. Approaches as discussed in detail in below use an Identity Wallet 13a, 13b with a distributed ledger 14 backend that replaces the typical centralized database (not shown). The ID Wallet/distributed ledger approach provides enhanced user experience, security, compliance and so forth, as discussed below. The ID Wallet can replace and/or complement a conventional physical security badge.

The system 10 includes user devices, here wireless enabled user mobile devices, such as smartphones 12a, 12b that house respective identity wallets 13a, 13b. The smartphones 12a, 12b house the identity wallets (also referred to herein simply as wallets) 13a, 13b, respectively and thus carry user credentials and by use of the wallet and a processor on the smartphone, interacts with portions of the IAM system 10.

The term "smartphone" is used to describe a mobile phone device that executes an advanced mobile operating system. The smartphone has hardware and a mobile operating system with features of personal computer hardware and operating systems along with features required for mobile or handheld operation, such as those functions needed for use of the smartphone as a cell phone and includes GPS (global position system) navigation. The smartphone executes applications (apps) such as a media player, as well as browsers, and other apps. Smartphones typically can access the Internet and have a touchscreen user interface. Other types of user devices could be used including personal computers, tablet computers, as well as, systems that are involved with exchange of sensitive data, such as access control systems and intrusion detection systems.

Other form factors can be used to house the identity wallet 13a such as wearables. Other aspects of identity can include biometrics. The smartcard may also have various physical forms. For illustrative purposes, the discussion will focus on the user devices 12a, 12b as being smartphones. The identity wallets 13a, 13b are housed in the smartphones. As used herein an identity wallet includes an application that executes on an electronic device, such as the user devices 12a, 12b, and which allows a user of the device to store identity information, encrypt such identity information and communicate with external systems via communication functions/circuity on the smartphone.

Identity Wallets 13a, 13b are also used to authenticate credentials of the holder of the particular wallet, as well as other wallets and other systems/devices, as will be discussed below. The term "wallet" encompasses an arrangement of three major systems, an electronic infrastructure, an application that operates with the system and the device (e.g., smartphone) that holds the wallet. In the discussion below, the holder's proprietary data is associated with the wallet. For example, many pieces of identifying information can be stored in the wallet.

Such information can be diverse and wide-ranging, such as, bank account information, as well as the holder's information such as driver's license, health records, health care, loyalty card(s) and other ID documents stored on the phone, social security no., etc. All of this information can be stored in some manner and/or linked to the wallet. In particular stored in this wallet are pieces of information identifying the users. Systems are broadly defined as mechanical, electromechanical, and electronic systems, such as computers. Many of such systems will have a component of which is computer controlled. Software is defined as the programming code tangible stored and residing in an electronic machine, such as a computer system, and which coded is executable or executing under normal conditions.

In the discussion below, in particular, the wallet holds a user's credentials, e.g., authorized credentials that are needed for auto configuration of intrusion detection system modes based on verification results obtains from system 10. In the discussion below a focus will be on user device 12a and wallet 13a.

The system 10 also includes a distributed ledger system 14. The distributed ledger system 14 is a sequential, distributed transaction database. An example of a sequential, distributed transaction database is the so-called "Blockchain" that operates with cryptocurrencies, such as "bitcoin"® (bitcoin project.org). The distributed ledger 14 rather than being dedicated to managing cryptocurrencies, manages PII transactional records and other types of records such as expertise records or level of expertise records rather than cryptocurrencies, and serves as the backend for a distributed access and talent verification system. The distributed ledger system 14 interacts with the user's wallet as well as third party systems to register user's and allow access to users to facilities. While sharing some similarities to the Blockchain as well as other known types of sequential transaction databases, the distributed ledger 14 has some significant differences.

Accordingly, the distributed ledger 14 has a structure as set out below. In some implementations of the distributed ledger 14, the system 10 also includes a service broker system 16 that is a third party service system that interfaces between the wallet 13a and the distributed ledger 14. In other implementations, the service broker system 16 is not needed.

From the distributed ledger 14 encrypted PII data and expertise level data upon request are transmitted to third party systems, as well as sending to third party systems listings of verifying systems, upon receiving access requests from the third party system. The service broker includes a hardware platform. For example, with a self-contained enterprise example, the Service Broker would include a hardware platform (e.g., a server computer system), a server operating system and a "calculator/attester algorithm" (discussed below). The "calculator/attester algorithm" would broker between the source and target peer-to-peer entities such that a minimal amount of information required to legitimize and execute an information exchange between the source and target is determined, exchanged, and validated so that a "transaction" can occur. The record of the transaction is written into the distributed ledger 14 with the minimum amount of PII or MII information, if any, including any metadata regarding the transaction or the information.

The system 10 also includes external systems 18. In some examples these eternal systems 18 are third party systems and can be any electronic system (or device) that seeks some aspect of the PII or other confidential information of a user or held by the user device 12a or expertise level data associated with the user. In the examples discussed below, the external systems (or third party systems) 18 are registration systems in other examples the external systems are intrusion detection systems and in still others access control systems.

In particular, the third party systems 18 in the discussion below are or include aspects of physical intrusion detection systems. By physical intrusion is meant unauthorized physical access to physical locations, e.g., facilities. The examples discussed below are in relation to physical intrusion detection systems. In the processes discussed below, some or all of the aforementioned user device 12a, wallet 13a, distributed ledger 14, optionally service broker 16 and third party systems 18 are used.

IAM System Used with Intrusion Detection System

Currently, intrusion systems are turned off and turned on by the authorized residents of the area being protected. In this manner, the system is only protecting the premises when the system is turned on by an authorized resident.

Figure 1A:
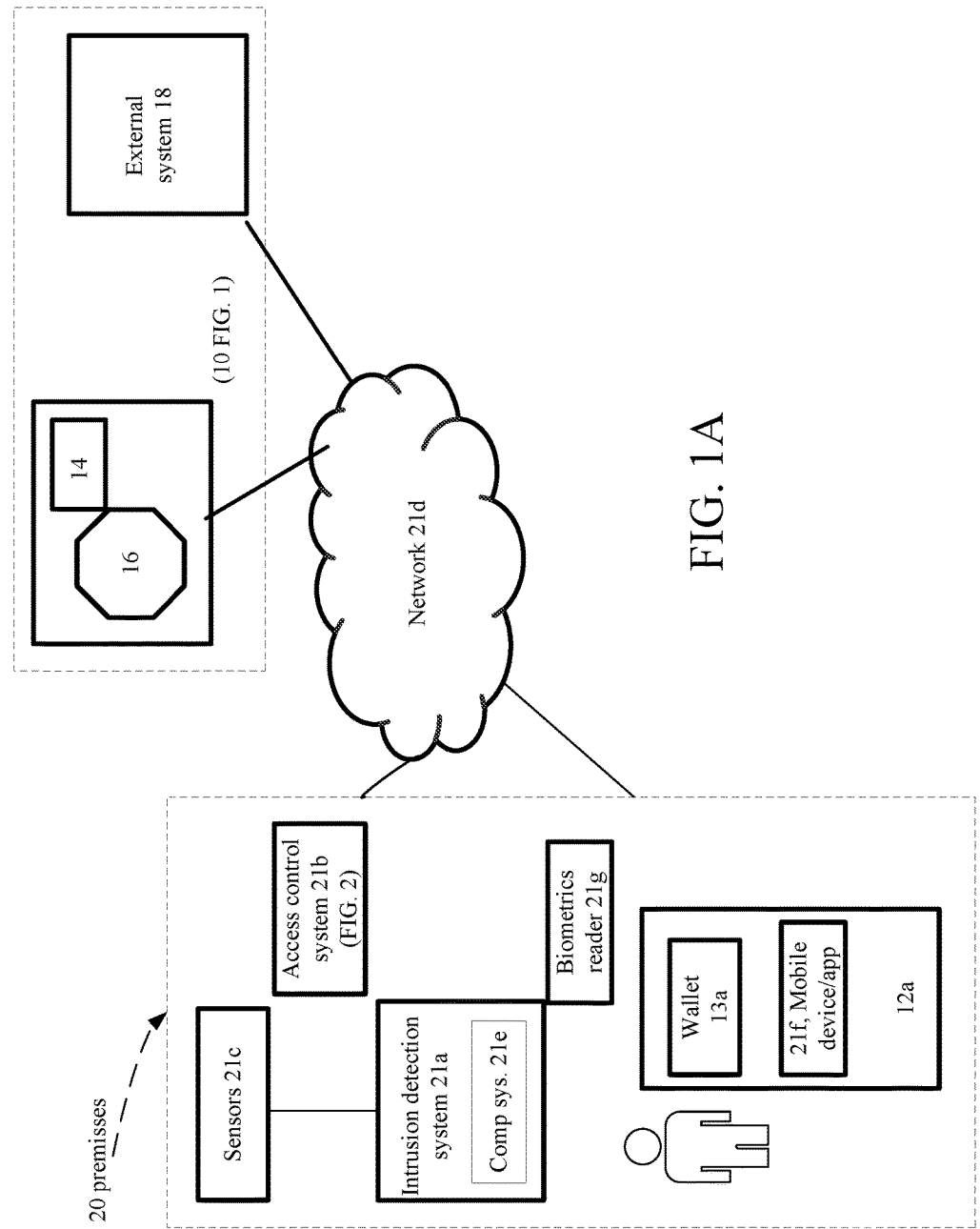
FIG. 1A is a schematic diagram of an exemplary intrusion detection system using PII verification.

Referring now to FIG. 1A, a premises 20 (physical facility such as a residence or a commercial or governmental facility) is shown. Included in the premises 20 is an intrusion detection system 21a that is always on and can be in a cooperative relationship with an access control system 21b. The intrusion detection system 21a is a specific example of external system 18. The intrusion detection system 21a is coupled to the IAM system 10 (FIG. 1, as described above) via network 21d. Authorized user(s) registered with the IAM system 10. The IAM system 20 checks identification and biometrics of entities within the premises. One exemplary process for registration processing is set out in FIGS. 12A-12C. Part of the intrusion detection system 21a includes sensors 21c that are coupled to the intrusion detection system 21a. The sensors 21c gather physical/chemical/optical, etc. data that are processed by the intrusion detection system 21a to detect physical intrusions. The intrusion detection system 21a includes a computing system 21e that has access to network 21d. Also shown in the premises 20 is a user having a user device 12a and a digital wallet 13a (as in FIG. 1) that executes in a mobile device application 21f and a biometrics reader device 21g.

When an authorized user (having a user device 12a and a digital wallet 13a with verified credentials) enters an area, about or within the premises 20, the authorized user presents credentials to the intrusion detection system 21a. These credentials (discussed below) are presented either at a typical access control system 21b credential reader (see FIG. 2) (or another type of reader) and/or through the mobile device 12a running the identity wallet 13a and/or via the mobile device 12a running the mobile device app 21f (another type of app) and/or via the biometric reader 21g that reads the user's biometric data.

In some implementations, as discussed below, the credentials are presented directly to the intrusion detection system 21a or a security system 184 (FIG. 11) associated with and/or part of the intrusion detection system 21a. The credentials presented to the intrusion detection system 21a (either indirectly via the access control system or directly) allows the intrusion detection system 21a to validate a registered user's identity using the IAM system 10 by the user having previously verified its identification and biometrics to the IAM system 10.

Subsequently, if the authorized user passes additional identification information to a recipient system, such as the intrusion detection system 21a, via the credential reader (FIG. 2 or other type of reader), mobile device 12a running the identity wallet app 13a or the mobile device 12a running another type of app 21f or via the biometric reader 21g, the intrusion detection system 21a can trust that the information came from a trusted source. This additional information could be used to configure the intrusion system 21a in one mode of operation when the specific, verified user arrives and in a different mode of operation when the specific, verified user departs the premises. For example, the intrusion system 21a in one mode always remains "on" but changes modes of operation based whether the specific, verified user is present.

For a different authorized user, that user also passes such additional, but different identification information to the intrusion detection system 21a. The intrusion detection system 21a also trusts that the information came from a trusted source. However, this different additional information from the different authorized user could be used to configure the intrusion system 21a in second mode of operation when that specific, yet different authorized user arrives and in a different mode of operation when that specific, yet different authorized user departs the premises. For example, the intrusion system 21a in one mode always remains "on" but changes modes of operation based whether the specific, yet different authorized user is present.

Accordingly, a set of rules are set up. These rules are used to configure the intrusion detection system 21a in different modes of operation (as well as different privileges) according to various criteria, including time, day, date and in particular who is present. Example rules that configure the intrusion detection system in different modes are discussed below. These rules are stored in a data structure in the computer system 21e and are executable according by the intrusion system 21a.

Figure 1B:
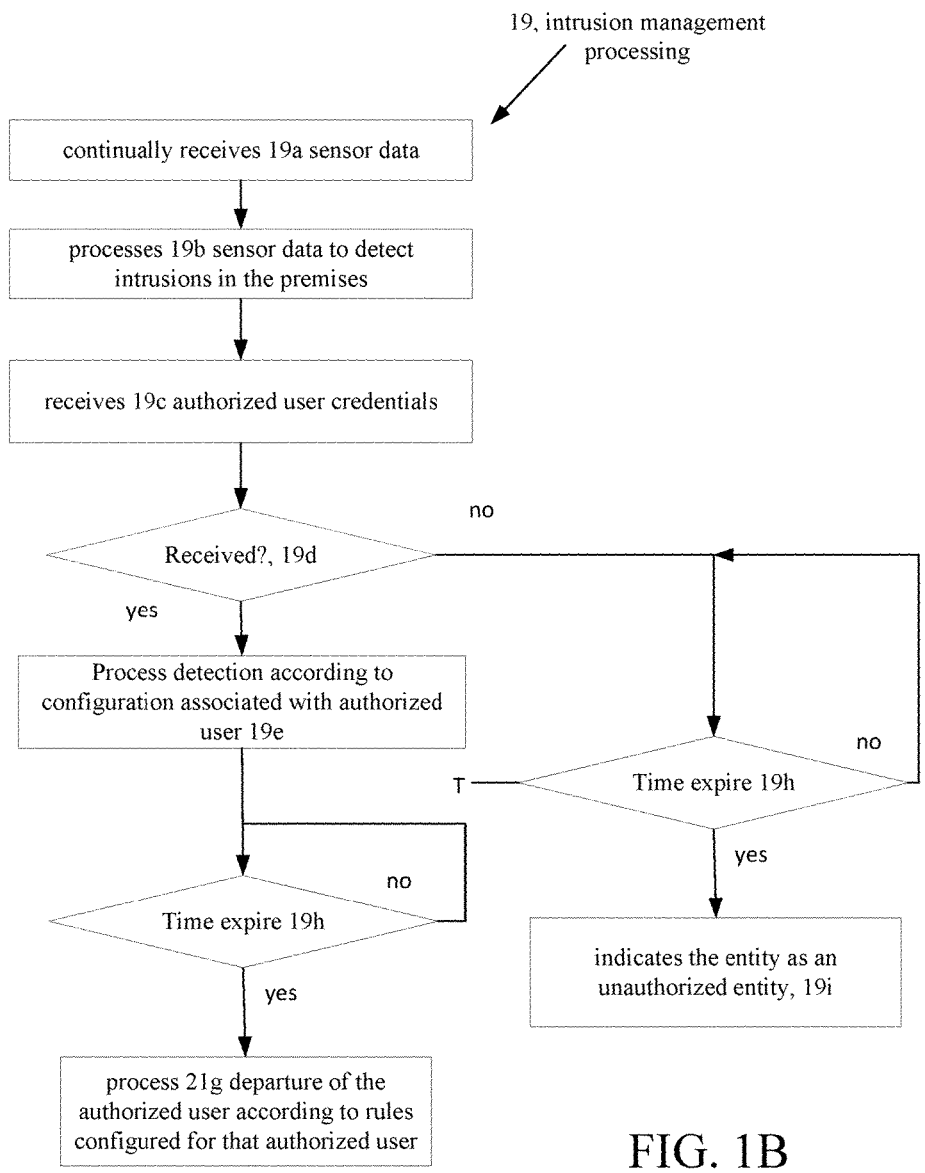
FIG. 1B is a flow diagram of PII processing for intrusion detection management.

Referring now to FIG. 1B, an overall view of intrusion detection management processing 19 is shown. Intrusion detection management processing 19 continually receives 19a sensor data and processes 19b the sensor data to detect presence of entities within or about the premises. At times, the intrusion detection management processing 19 upon processing of the received sensor data detects presence of entities within or about the premises. The intrusion detection management processing 19 either subsequent, co-incident or prior to detecting the presence of entities within or about the premises, receives 19c (or waits to receive 19d) authorized user credentials that are presented to the intrusion detection system 21a (using one of the approaches mentioned above). Upon presentation by an authorized user of that user's credentials, the intrusion detection system 21a processes 19e the detection according to rules configured for that user. When the authorized user leaves 19f, the intrusion detection system 21a processes 19g the departure of the authorized user according to rules configured for that authorized user.

However, if after a threshold time period, "T" after detection of an intrusion, the intrusion detection management processing 19 has not received 19h (wait period expired) any authorized user credentials, the intrusion detection management processing 19 will produce 19i a result that indicates the entity as an unauthorized entity. The intrusion detection system 21a, upon processing the detection and the result will apply a different set of rules for unauthorized users including raising an alarm condition. The threshold time period, "T" can be any value and typically is a configurable value. An exemplary, non-limiting, range is 5 seconds to 2 minutes.

Figure 2:
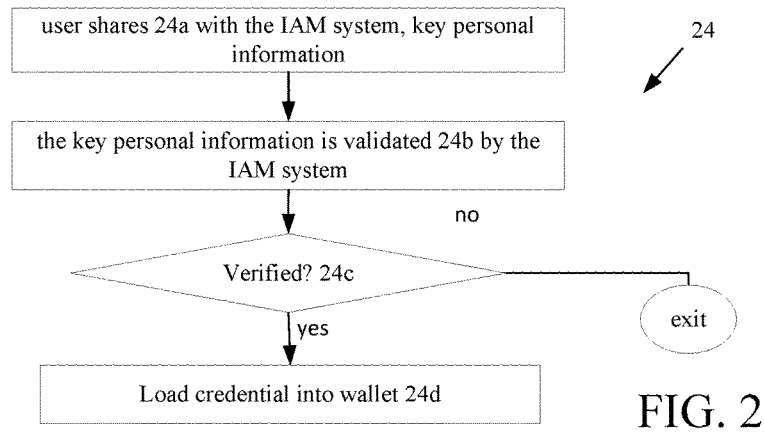
FIGS. 2-4 are flow diagrams of intrusion detection management.

Referring now to FIG. 2, generally, a user will be pre-registered with the intrusion detection system that performs the intrusion processing 19. As part of pre-registration, the user's device 12a, e.g., wallet 13a shares 24a with the IAM system 10 (FIG. 1), personal information that is validated 24b by the IAM system (i.e., with entities that are part of the distributed ledger 14 such as, for example, a governmental entity). A pre-registration process is discussed below. When verified a credential is loaded on the user device 12a, e.g., wallet 13a.

Figure 3:
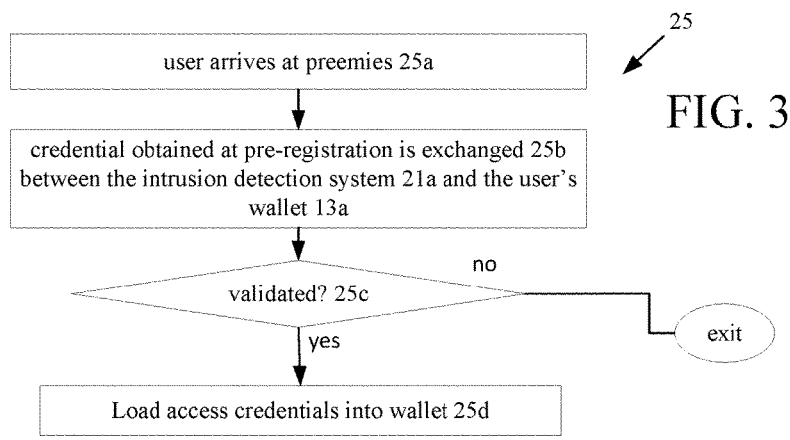

Referring now to FIG. 3, arrival processing 25 is shown. When the user arrives 25a at the premises, the information obtained during pre-registration is exchanged 25b between the intrusion detection system 21a and the user's wallet 13a. The exchanged information is validated on the block chain. When validated 25c, the arrival processing 25 supplies the user's wallet with proper credentials that allows the user access to required areas of the premises, with requisite privileges as needed and according rules set up or that are then set up for that user. If exchanged information is not validated on the distributed ledger, the process 25 can wait for a manual intervention (or the process can exit, raise an alarm, or take other action).

Figure 4:
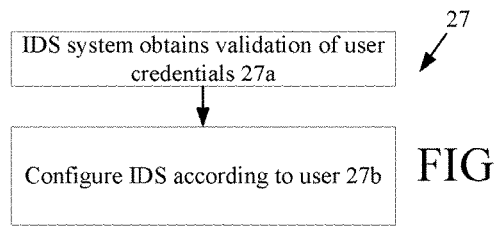

Referring now to FIG. 4, credential processing 27 is shown. The intrusion detection system 21 validates 27a that the user has the required credentials. Upon validation, the credential processing 27 configures 27b intrusion detection system according to the user. Credentials are used to provide the user as an authenticated user. This will secure the premises from unauthorized entry and access.

Example rules to configure the intrusion detection system 21a in different modes of operation include:
Statement; <person>; "status"; --action--; &components&; [security level]
   where for security level given by a range, e.g., 0 to n with 0 being lowest.
   Example rules using the above pseudo nomenclature are:
If; <A>; "is present"; --disarm--; &all alarm contacts&; [Level 0 security]
If; <B>; "is present"; --arm--; &all alarm contacts&; [Level 3 security]
If; <C>; "is present"; --only arm--; &contacts at the rear&; [Level 2 security]
If any of authorized persons <A, B, C,> is present, use Level 0 security
If none of authorized persons <A, B, C,> is present, use Level n security
If all of authorized persons <A, B, C,> are present, use Level 0 security
If; <any other person>; "enters the premises"; --without being identified by the system as an authorized resident--; &the alarm would be triggered&; [Level n security]
If any authorized person is present <A, B, C,>, and If; <any other person>; "enters the premises"; --without being identified by the system as an authorized resident--; &the alarm would be triggered&; [Level n security]

The rule nomenclature is illustrative. Additionally, the rules can take into consideration different usage traits that are programmed by the rules, so that the intrusion detection system 21a can automatically enable different alarm states based on the identity of the authorized user. For example, since the system knows who is present in the premises, the intrusion detection system can access user profiles and determine how the user wants the intrusion detection system configured, while present in the premises (as reflected in the above rules). For example, if an authorized user returns to the premises late at night, upon arrival the authorized user profile could indicate that the system should immediately alarm all contacts as soon as the authorized user enters the premises, irrespective of any other rules established for that user. As another example, is during the middle of the day when the authorized user enters, the intrusion system 21a could remain on for windows and door contacts on the back side of a building but turned off for the main entry. Many different types of profiles can be set up once the system knows the identity of the occupants.

The intrusion detection system 21a could be configured to automatically identify the occupants of a building using sensors that receive data from badges that transmit an electronic message or by sensors that receive data that is processed into visual information to which facial or body characteristic recognition, biometrics, or other methods of identifying the authorized users are used. A motion detector can include biometric identification technology processing that identifies the presence of a person and the specific identity of the person.

Figure 5:
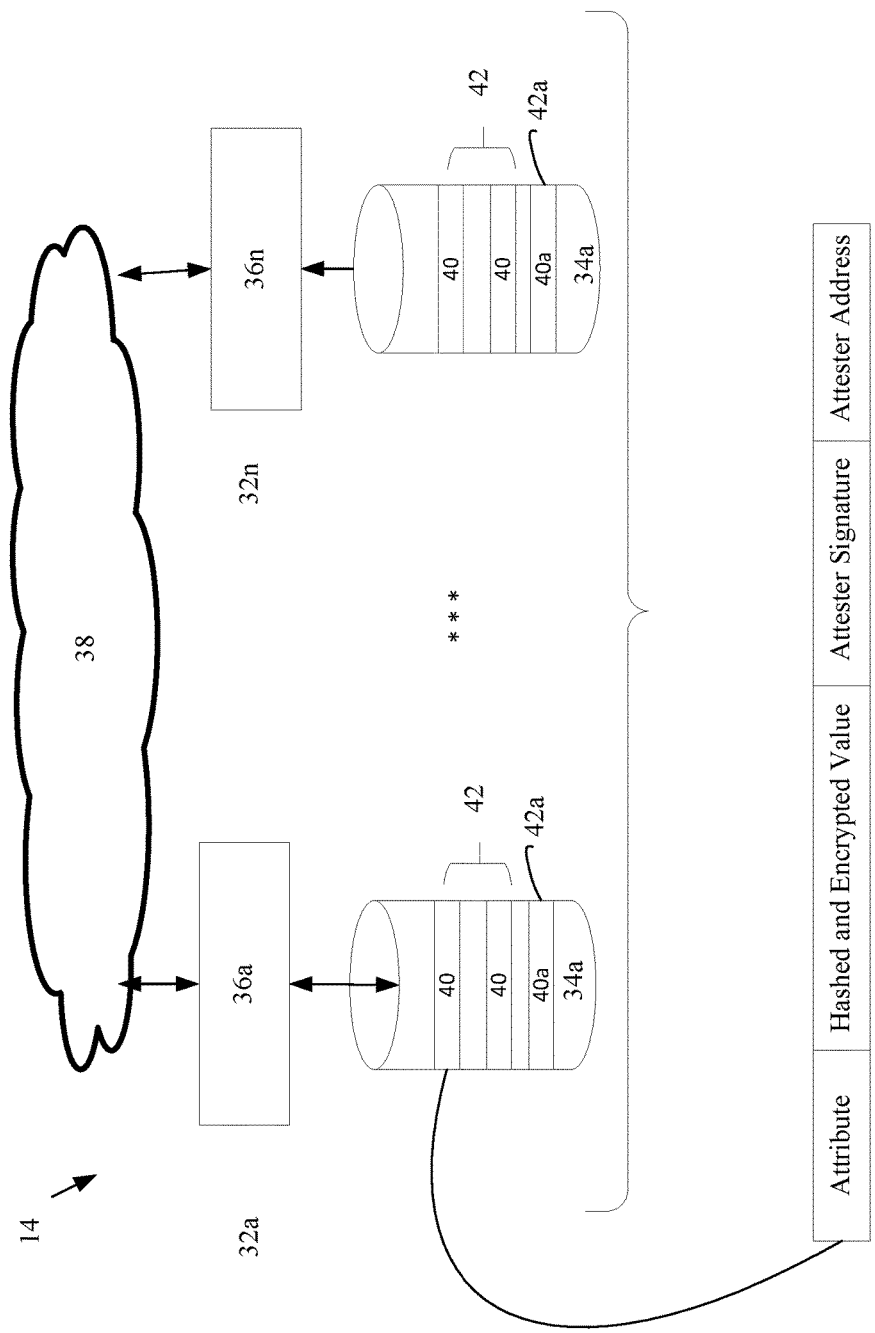
FIG. 5 is a block diagram of a distributed ledger.

Referring now to FIG. 5, the distributed ledger system 14 is shown. As mentioned, the distributed ledger system 14 is a sequential, distributed transaction database. The distributed ledger system 14 thus includes distributed databases 32a-32n that are typically existing in the "Cloud." The distributed database comprise storage devices 34a-34n that are attached to different interconnected computers 36a-36n. The distributed databases are controlled by a distributed database management system that controls storage of data over a network 38 of the interconnected computers and execute corresponding replication and duplication processes. Replication software (not shown) detects changes in the distributed database contents and once the changes have been detected, replicates the changes to have all the databases the same. Duplication software (not shown) identifies one database (not shown) as a master and then duplicates that database across other databases. Replication and duplication keep the data current in all distributed storage locations.

Each of the distributed databases 32a-32n that form the distributed ledger system 14 store encrypted information records. Typically the records will be a hash of an information record or a hashed pointer to an information record. In theory, assuming that the distributed databases 32a-32n could be hacked, a hacker will not access the actual data in information records, but only a hash of the actual data. An exemplary record 40 is shown below. The record 40 is stored in each of the distributed databases 32a-32n that form the distributed ledger system 14, which stores the record 40 in an encrypted form in the distributed ledger system 14. Record 40 has a structure that includes an attribute type, a hashed and encrypted value of the attribute, an attester's digital signature of the hashed and encrypted value and the attester's address.

An exemplary record format is set out in table below.

| User Attribute | Hashed and Encrypted Value | Attester Signature | Attester Address |
|---|---|---|---|
| Attribute | encrypt(attribute) | Signature of encrypt(value) | Address |

An exemplary set of records is set out in table below. A set 42 of such records 40 can correspond to a user's profile. This set 42 (or profile) is added to with new records as new attributes of the user are added to the distributed ledger system 14.

| User Attribute | Hashed and Encrypted Value | Attester Signature | Attester Address |
|---|---|---|---|
| Citizenship | encrypt(USA) | Signature of encrypt(USA) | attst@cadmv.com |
| Current Age | encrypt(age) | Signature of encrypt(age) | attst@cadmv.com |
| Home Address | encrypt(address) | Signature of encrypt(address) | attst@cadmv.com |
| Height | encrypt(height) | Signature of encrypt(height) | attst@cadmv.com |
| Access credentials | encrypt(credentials) | Signature of encrypt(credentials) | secure@serv.com |
| * | * | * | * |
| * | * | * | * |
| * | * | * | * |

One can readily observe that what is stored in the distributed ledger system 14 is information about a user's attribute, a hash of that attribute, information about an attester to the attribute, which information is attester signature system, and attester address. The attester when contacted can attest to the requested information being valid. For example, given a user's birth certificate that is issued by a state governmental agency that state governmental agency converts the birth certificate to a digital file of the document, and that digitized file of the document is hashed to provide a hash of the digitized birth certificate document. Rather than the document itself being stored (or the digitized document being stored, what is stored is the hash of the digitized birth certificate document, that is stored in a user's profile in the distributed ledger 14.

Within a domain, distributed ledgers exchange information to maintain identical ledgers, with any suitable so called sequential transaction database technology of which "Blockchain" technology is but one example. However, unlike some electronic currency based technologies, e.g., bitcoin, where the Blockchain is designed so that no entity controls the Blockchain in some examples disclosed herein using the techniques disclosed herein the transaction database technology actually exchanges information within a domain and because such domains could be private transaction databases, each entity or industry could structure the transaction database as different private transaction databases.

Figure 6:
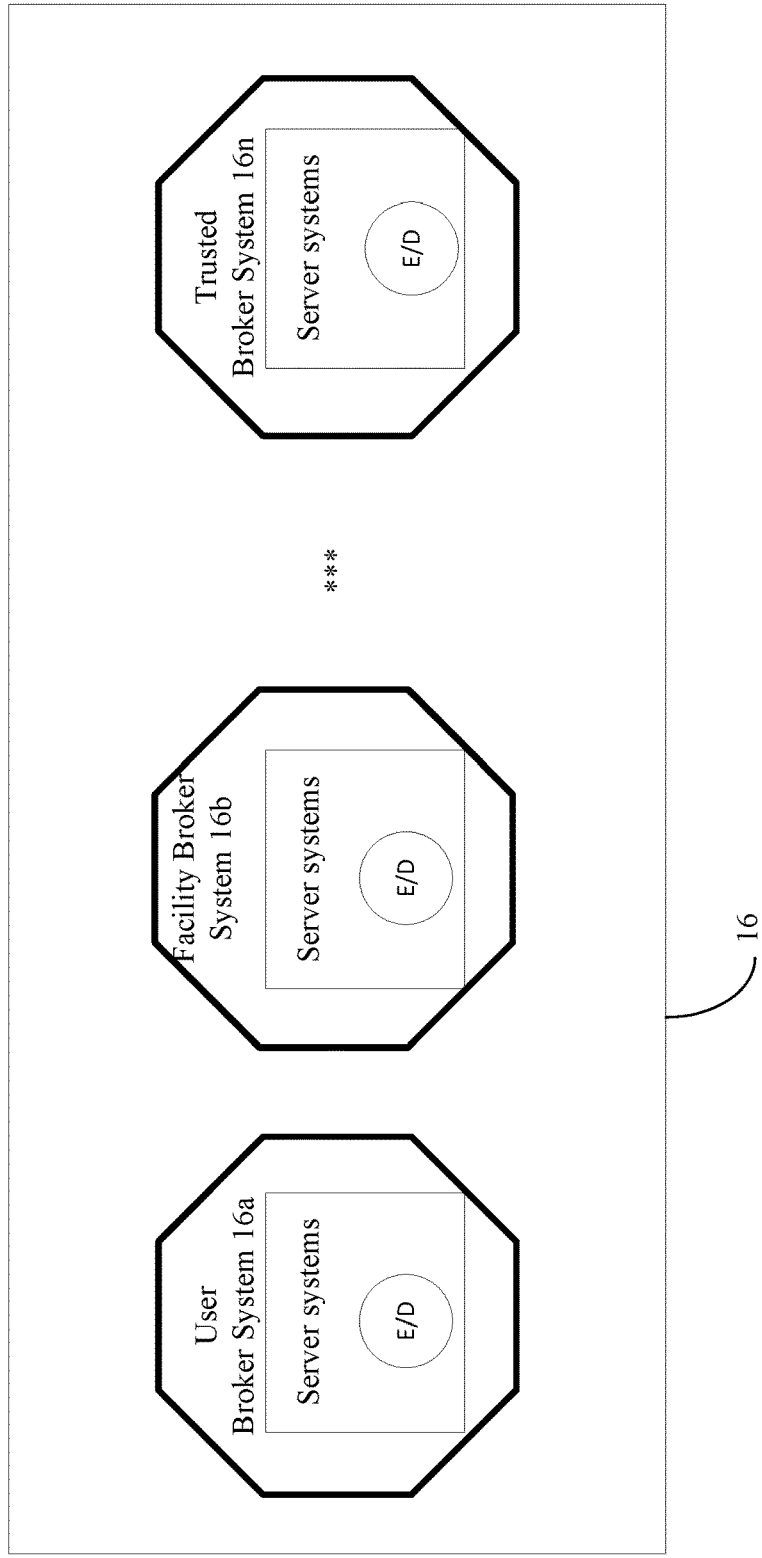
FIG. 6 is a block diagram of a broker system.

Referring now to FIG. 6, the broker system 16 is shown. The broker system 16 includes a computer system and executes software that handshakes between the user system 12 and the vetting agent or attester. Rather, than the user device 12*a* accessing the distributed ledger 14, all requests for transactions between the user device and the requesting device occur through the broker system 16. For some transactions, the broker system 16 accesses the distributed ledger system 16, whereas in other transactions the requesting system 18 accesses the distributed ledger system 16.

As shown in FIG. 6, the broker system 16 can be a compilation of many such broker systems 16*a*-16*n*. Each of the broker systems 16*a*-16*n* can comprise computer systems and associated distributed databases. The broker systems 16*a*-16*n* are distributed over a network of servers that act together to manage the distributed ledger 14. All attribute hashed values, attester information, etc. are stored in the distributed ledger 14 and as the flow diagram below will show the broker systems 16*a*-*n* are configured to access the distributed ledger 14 to obtain and validate such information. Also shown in FIG. 6, are the encryption and decryption (E/D) of data flows that take place between the broker systems 16*a*-*n* and wallets 13*a*.

Note that in the context of a private distributed ledger environment, for an enterprise, it may be desirable to not have a query sent to the attester database for each transaction. Rather, a business rule could be established that once a validation event has occurred, then it is good for a period of time, until the attester database is updated etc., so as to reduce latency.

Figure 7:
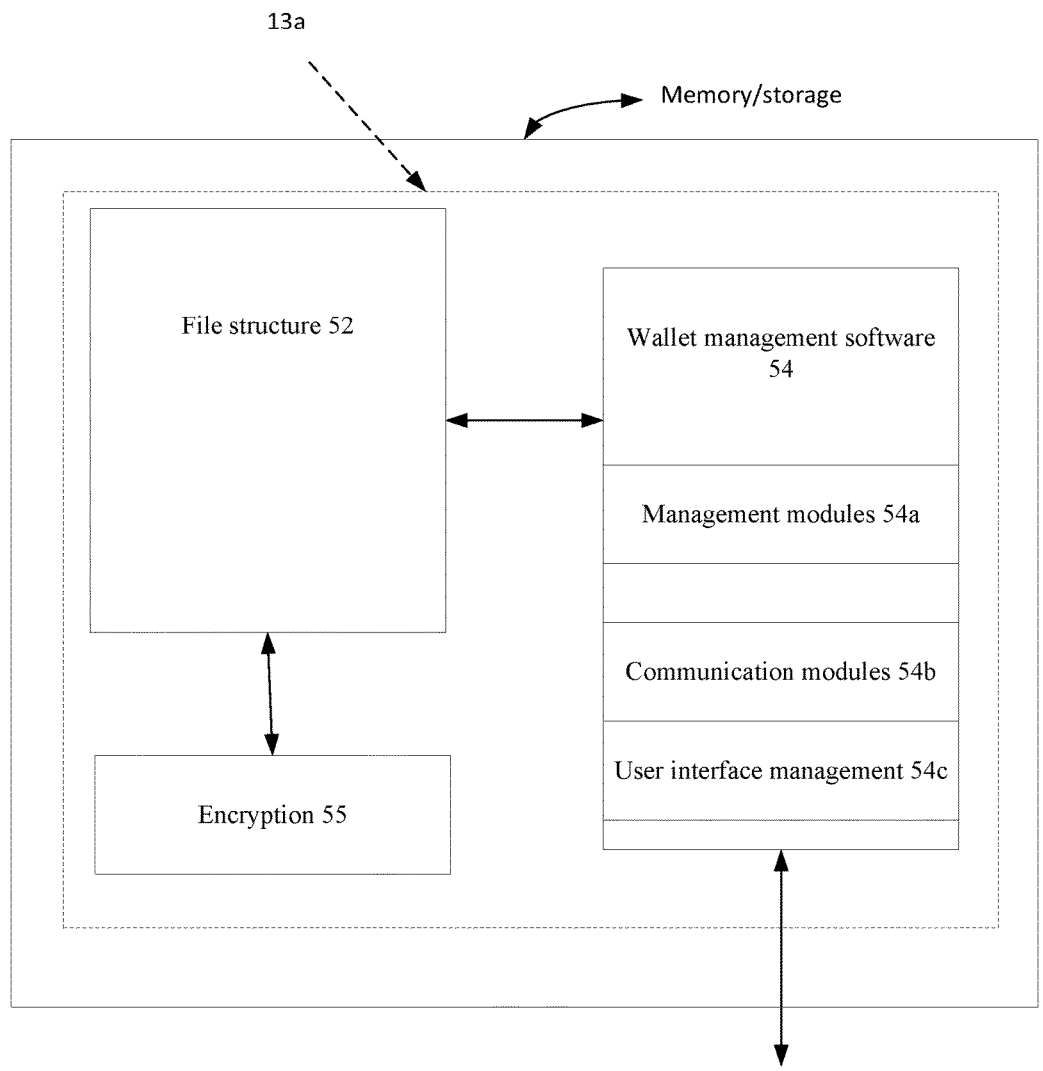
FIG. 7 is a block diagram of an identity wallet.

Referring now to FIG. 7, the wallet 13*a* is shown. The wallet 13*a* includes a file 52 structure and wallet management software 54 that are stored on a user device 12*a* (FIG. 1). In addition to the software comprising management modules 54*a* that handle request and access to the file structure, as well as receiving user authorizations, etc., the software also includes communication modules 54*b* that exchange information between the wallet and requestor systems, and between the wallet and the broker system 16 (when used) and that receives requests for information that result in messages being displayed on the user device 12*a*.

The wallet 13*a* stores information for handling a third party request for data directly from a user that transmits that information directly from the wallet 13*a* to the intrusion detection system 21*a* in a secure manner. The wallet 13*a* may take several form factors—a physical ID Wallet such as a credit card, smart wearable etc. or it may only need to be the software payload that a system pushes out to a commercially acceptable mobile device such as a smartphone. In some implementations, the wallet needs to be in communication with a device that can perform calculations/determinations, as will be discussed below.

The wallet 13*a* has the management module 54*a* that handles third party requests for information and/or attributes and the communication module 54*b* that interfaces with the broker system 16. The wallet 13*a* includes a module 54*c* that allows a user to view the request and either approve, all or part of none of the request. Upon approval (partial or all) of the request, the wallet 13*a* encrypts via encryption module 55 the requested information using a public key infrastructure (PKI) where a public key of the third party is used along with one the private keys associated with the wallet 13*a* to encrypt the data. The encrypted data can either be sent to the user's broker system 16 or the wallet 13*a* can look up the direct address of the intrusion detection system 21*a* and send the encrypted data directly to the intrusion detection system 21*a*, depending on the implementation of the system 10.

As known, a public key infrastructure (PKI) is a set of hardware, software, people, policies, and procedures needed to create, manage, distribute, use, store, and revoke digital certificates and manage public-key encryption. The purpose of a PKI is to facilitate the secure electronic transfer of information for a range of network activities such as e-commerce, internet banking and confidential email. PKI is required for activities where simple passwords are an inadequate authentication method. In cryptography, PKI binds public keys with respective user identities by means of a certificate authority (CA) within a CA domain. The user identity is unique within each CA domain.

Figure 8:
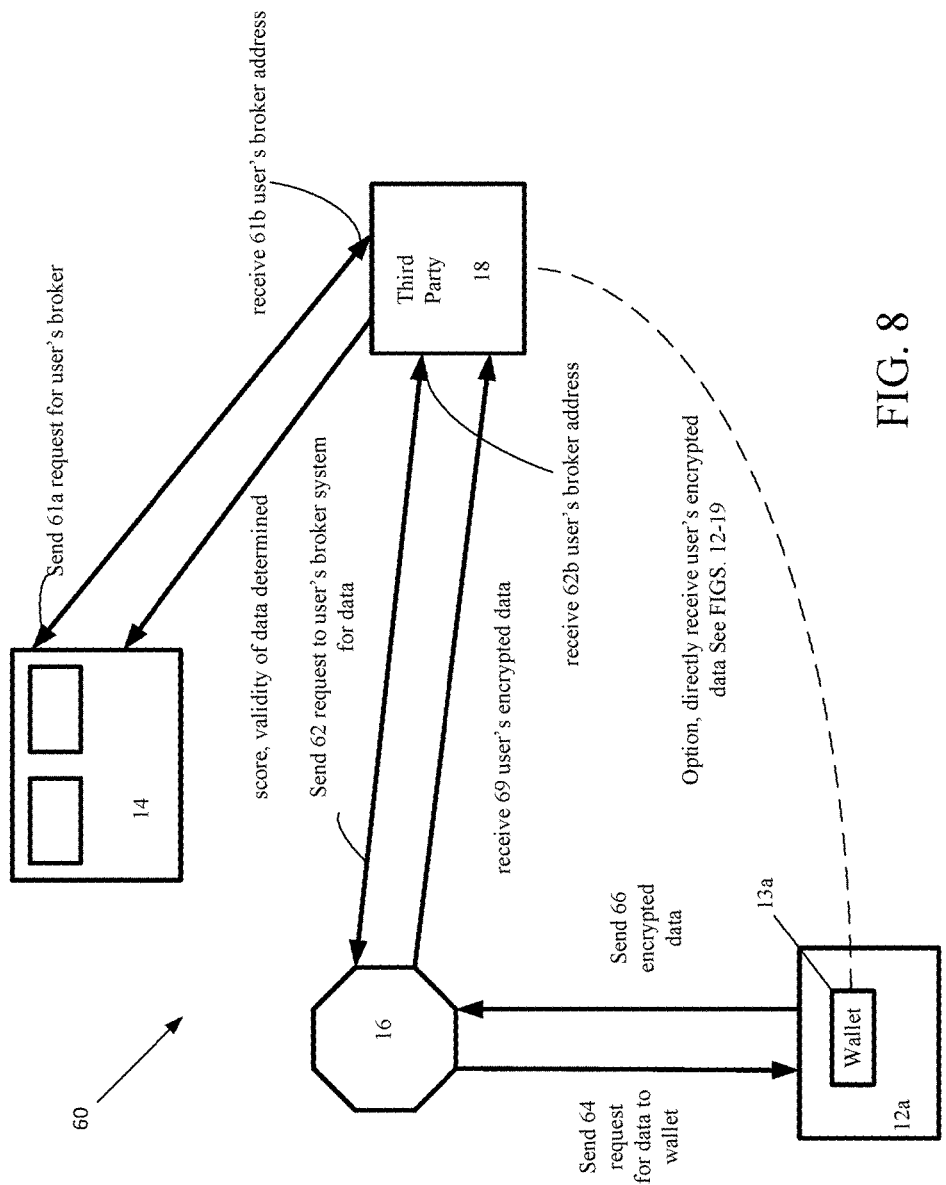
FIGS. 8-10 are block diagrams for message exchange processes.

Referring now to FIG. 8, a diagram of a process 60 and flow for the process 60 where the intrusion detection system 21a requests information from the user system 12a. In this case, the broker system 16 provides an asynchronous transfer between the user device 12a and the intrusion detection system 21a. The intrusion detection system 21a sends a message request 61a to the distributed ledger 14 for the user's broker system. In general, there can be many such broker systems associated with many users. The intrusion detection system 21a receives 61b a message that includes an address of the user's determined broker, as received from the distributed ledger. (In the following figures, as needed, double arrowed lines and reference characters on tips of such arrows are used to denote paired messages, such as sending and receiving messages.) In other implementations, the address lookup can also go through the exchange network.

In an implementation that uses a broker, the intrusion detection system 21a sends 62 a message to the user's determined broker 16, which message includes a request to access data on the user's wallet 13a. The request for data is sent 64 from the broker system 16. A "score" is calculated for determining the validity of the data (rather than being a measure of the secure transmission of the data). A scoring algorithm can be based on the number and types of attesters, etc., to the user's wallet 13a on device 12a. Various algorithms can be used such as one that weights types of attesters and number of attesters and normalized these to a standard. Thus, a score generated with a large number of highly trusted attesters would be higher than a score generated with a large number of attesters having a low level of trust. An alternative to this type of score is an attester score based on the type of attester and how trustworthy the attester is and has been. For example, see the following table.

| Score | Number of attesters of high trust | Number of attesters of moderate trust | Number of attesters of low trust |
|---|---|---|---|
| 0-10 | 0 | 0 | No more than X |
| 11-20 | 0 | 0 | Greater than X less than Y |
| 21-40 | 0 | At least M | * |
| * | * | * | * |
| * | * | * | * |
| * | * | * | * |
| 91-100 | At least Z | | |

One algorithm, as in the table above, is a mapping scheme that maps a score range (or values) to various slots based on empirically determined number of attesters (M, X, Y, Z) and empirically determined trust levels (high, moderate, low). This could be an example of a score for an item. Thus, with an item could be stored the number of and types of attesters of various categories (three of which, low, moderate and high trust levels being shown) or the score range or value.

Other scoring algorithms such as weighted algorithms could be used, such as one of the form:

$$Score = ((H*W_h + M*W_m + L*W_h)/total)/Normalized$$

Where H is the total of high trusted attesters
M is the total of moderately trusted attesters
L is the total of low trusted attesters
$W_h$; $W_m$; $W_h$ are empirically determined weights, and
Normalized is an optional normalization function or value.

The user's wallet 13a (or other application or user via a physical action using a user input device) either answers (yes or no) or simply ignores the message. When the answer is yes, the user's wallet 13a (or other application) encrypts the data using an asymmetric encryption algorithm that uses the requestor's public key. The encrypted data is sent 66 from the user's wallet 13a to the broker system 16 so that only the two endpoints (user's wallet 13a and the intrusion detection system 21a) can read the actual data. At the broker 16 system, upon reception of the encrypted data from the user's wallet 12a, the broker system 16 sends the data to the intrusion detection system 21a.

In another implementation, the data would be sent directly to the requestor's wallet without the broker system 16. This implementation can be especially used with the processes discussed below. In the processes below, this direct approach is used in the explanations of those processes.

Figure 9:
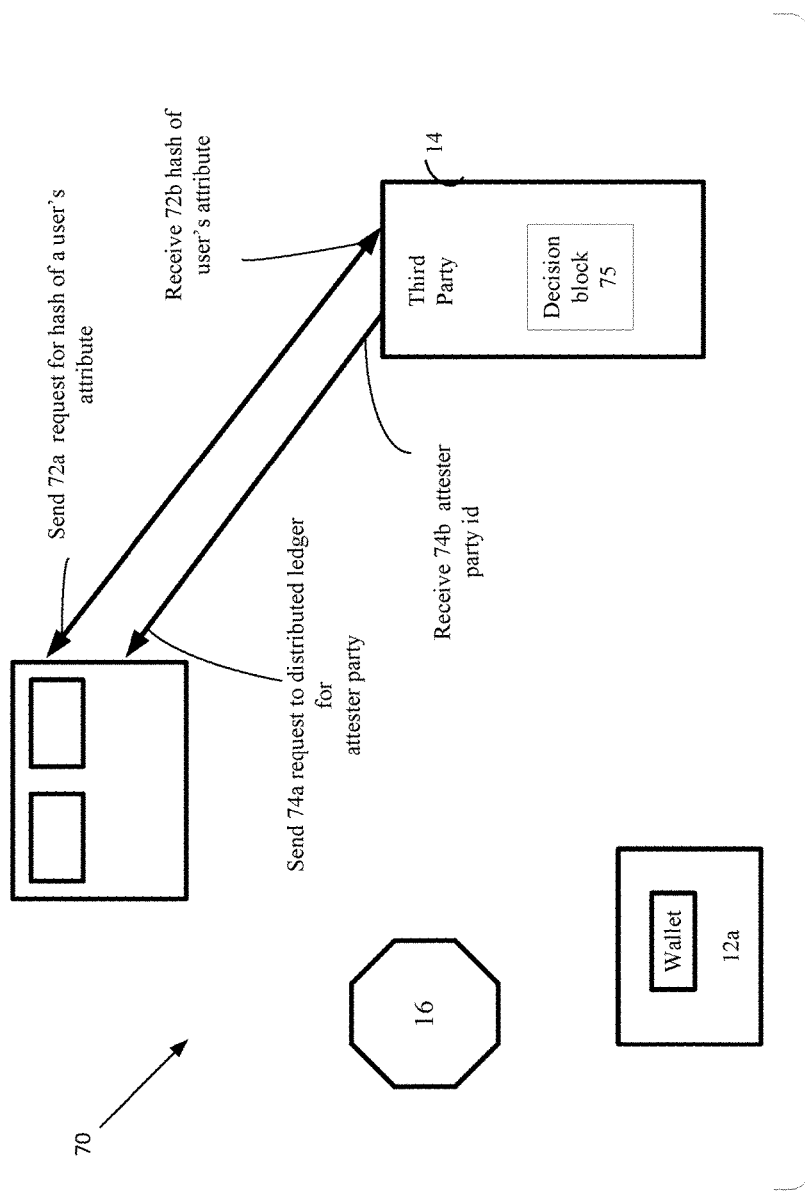

Referring now to FIG. 9, another process 70 is shown in which there is a required validation of PII data through a distributed public ledger 14a. The distributed ledgers can be public, meaning that anyone can place and/or access data in the ledger or private, meaning that only authorized individuals and entities can place and/or access the private type of ledger. Thus, generically, such distributed ledgers 14 can be public or private depending on various considerations. In either instance, the ledger 14 contains the information needed to validate the brokered information. The intrusion detection system 21a sends 72 a lookup request to the distributed ledger 14a for a particular user's attribute.

In FIG. 9, the broker 16 and wallet 13a and user device 12a are not directly involved, but are shown. The lookup request is actually for a hash of the desired user's attribute. The distributed public ledger 14a receives the request and accesses the hash of the particular user's attribute and returns 72b that hash to the intrusion detection system 21a. The intrusion detection system 21a sends 74a a look up message request for the system that has attested to the hash of the particular user's attribute stored in the distributed public ledger 14a. The intrusion detection system 21a receives 74b the identity of the system that performed the attestation to the hash of the particular user's attribute, and makes an independent decision 75 on the validity of the hash of the particular user's attribute. For cases where privacy of the data is a concern this case assumes that the third party system has the user's public key, as the attribute data is encrypted. For other types of data where privacy of the data is not a concern, the attribute need not be encrypted.

Note, in addition to returning the attester information, the system could return the attester score of that attester having the highest score. The score could be calculated by the distributed ledger 14, but may be more appropriately calculated by the broker system.

Figure 10:
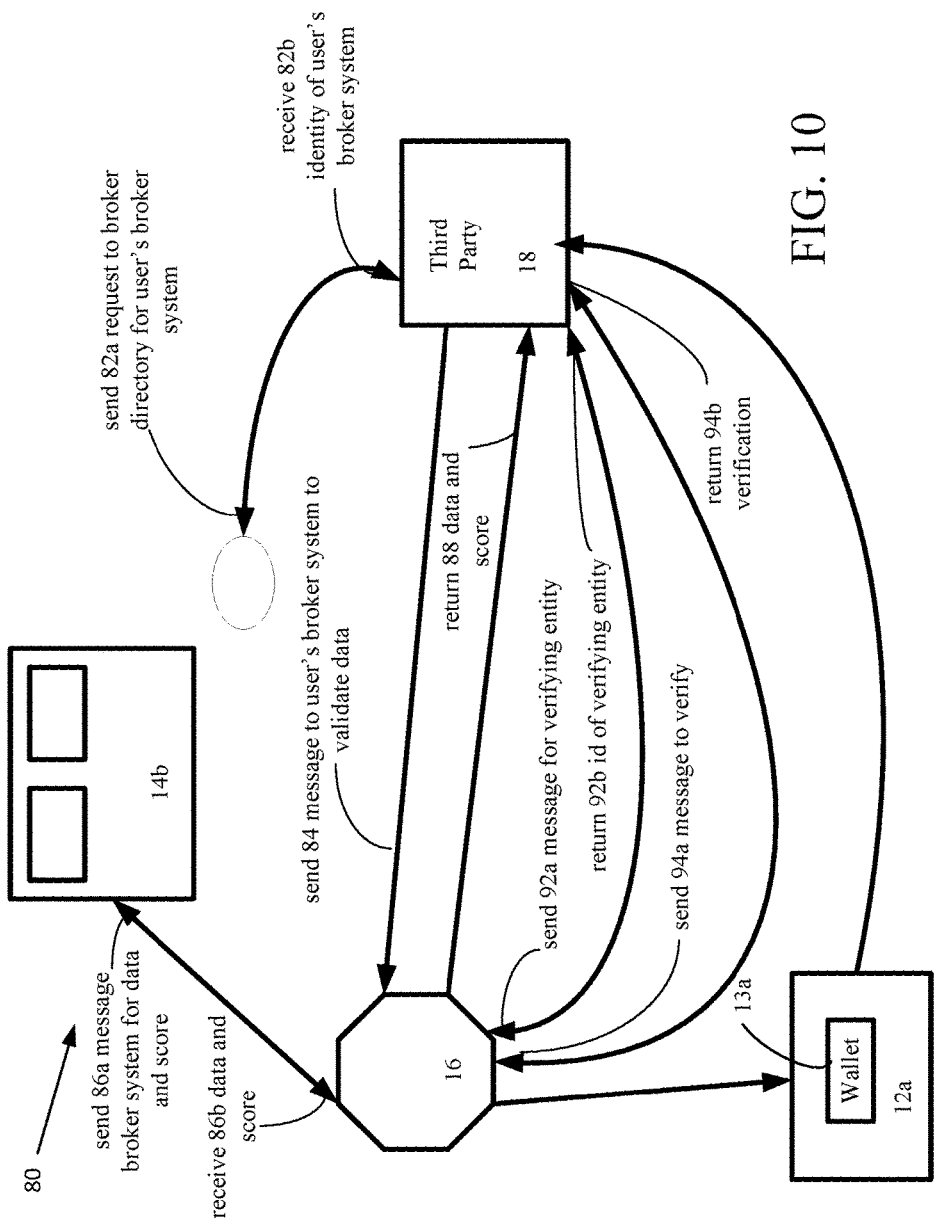

Referring now to FIG. 10, another process 80 is shown in which there is required validation of data through a private distributed ledger 14b. The intrusion detection system 21a sends 82a a message to a broker directory system 15 to locate the user's broker system. The broker directory system 17 determines the user's broker system and sends 82b a message to the intrusion detection system 21a, which includes the identity of the user's broker system. The intrusion detection system 21a sends 84 a message to the determined broker system 16, which is a request to the user's broker system 16 to validate data and return score data. There are many algorithms that could be used for scoring. For example, a simple algorithm may assign a score to an attester as high, when the attester is a governmental agency and may score an attester as lower when the attester is a personal contact. The user's broker system 16 validates data by sending 86a a message to the distributed ledger 14b for the data and the score (of the data or the attester). The broker receives 86b from the distributed ledger 14b a message including the data and the score(s). The user's broker system 16 returns 88 the score(s) and status back to the intrusion detection system 21a.

One approach for a private enterprise would be for an enterprise to define business rules that govern source attester scores. The rules could be absolutes. Alternatively, over time the system that determines the score builds "a transactional footprint" for transactions, which is based on physical access points, logical access points, time of day, duration of use, etc. used with a transaction record. Initial algorithms are determined at the initial deployment, and then are refined based upon a regression pattern(s) that emerges.

Optionally, the intrusion detection system 21a requests 92a a lookup of the broker/owner for the party that verified the data. The third party receives 92b the address of the broker/owner that verifies the data. The broker/owner system that verifies the data signs the data with its digital signature. The broker/owner system sends 94a a message to the verifying broker/owner to verify a signature of the signed data. Upon receiving 94b a verification from the verifying broker/owner system, the third party system has verification of the data without actually having accessed the data. Optionally, the user can share 96 the data to be validated with the third party directly from the user's wallet.

Another process (not shown) can be used in which a third party requests validation of an attribute without actually disclosing the attribute. In this process the wallet 13a does not send a hash of the attribute, but allows a third party to request the verification of the attribute from the exchange. A rule is submitted to the exchange of the user. The user would authorize the exchange for this rule to be processed. A trusted party attests to validity of the attribute.

Credential-Based Registration System

Described below are aspects of a mobile credential that is involved in configuring the intrusion detection system 21a with respect to permission decisions, provisioning privileges, and in particular modes of operation, etc. The mobile credential is stored in a user's wallet 13a and is identified as authentic by use of the distributed ledger 14. The distributed ledger 14 is used to supply secure credentials to the user's wallet 13a, which have been validated by the distributed ledger 14.

Figure 11:
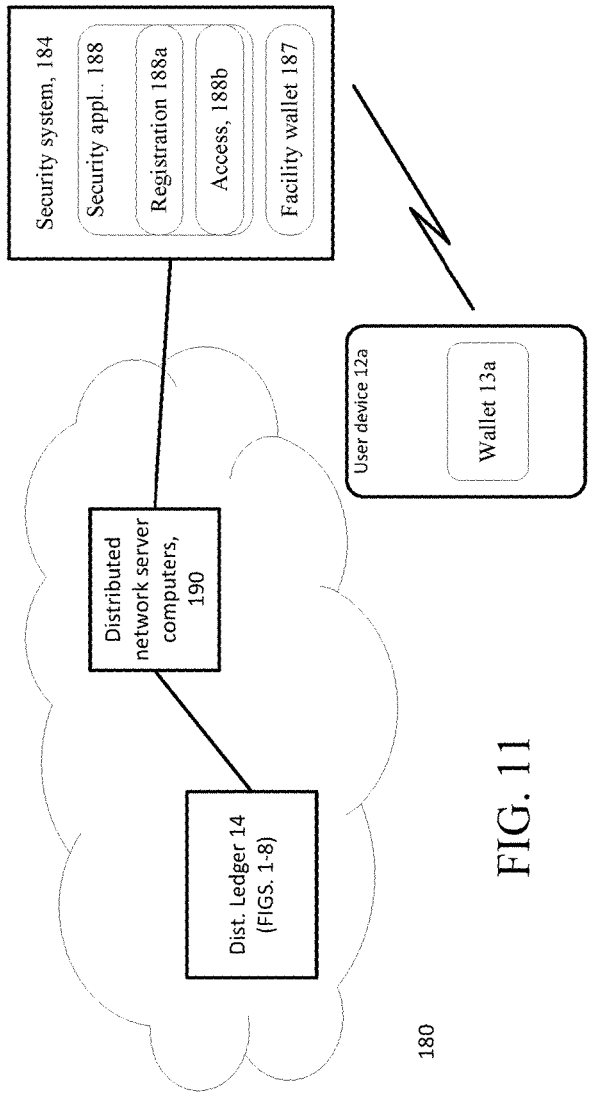
FIGS. 11 and 12 are block diagrams.

Referring now to FIG. 11, a credential-based registration/access system 180 that is a specialization of the system of FIG. 1, without the use of a broker system, is shown. The credential-based registration/access system 180 (registration/access system 180) is used for registration of a mobile credential with the intrusion detection system 21a using registration process 188a, the details of which will be discussed below. The registration/access system 180 includes the user device 12a having the wallet 13a. It is understood that a practical implementation would in general involve many such user devices/wallets of many users. The user device 12a and wallet 13a will be registered with the intrusion detection system 21a and verified for use with the intrusion detection system 21a. The registration allows a specific intrusion detection system 21a as well as any intrusion detection system 21a of the same entity to be registered by the mobile credential (if so desired by the facility owner). Additionally, the registration allows a specific intrusion detection system 21a as well as any intrusion detection system 21a of the same entity to be verified by the user device 12a prior to the user device 12a exchanging mobile credentials with the intrusion detection system 21a.

The credential-based registration/access system 180 (system 180) also includes the security system 184 (that can be part of or separate from the intrusion detection system 21a) including an intrusion detection system 21a security wallet 187 and an intrusion detection system 21a security application 188 that together with the user device 12a registers and verifies users, e.g., employees of an entity controlling the physical premises or logical structures, by use of the distributed ledger 14 and the distributed network server computers 190. The user device 12a and the security system 184 can be any type of computing system, computing station, computer server, tablet device, etc., that includes Bluetooth® or other near field communication capabilities that can send out a beacon signal, as discussed below. The security application 188 causes the security system 184 to continually or periodically issue the beacon that is readable by the user device 12a to initiate a transaction with the security system 184.

Figure 12:
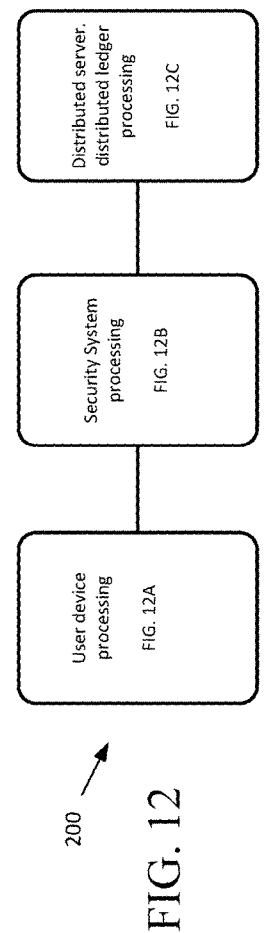

Referring now to FIG. 12, a credential-based registration process flow 200 for registration of a mobile credential stored on the user device 12a (more specifically in the wallet 13a) with the intrusion detection system 21a is shown. Shown in FIG. 12, are user device processing (FIG. 12A), security system processing (FIG. 12B) and distributed system/distributed ledger processing (12C). This credential-based registration process flow 200 (registration process 200) is shown for the user device 12a/wallet 13a, security system 184/security application 188, and the distributed servers 190 that interact with the distributed ledgers 14. The registration process 200 allows a user to verify the intrusion detection system 21a and allows any intrusion detection system 21a of the same entity to be registered by the mobile credential. The registration process flow 200 also allows the intrusion detection system 21a to verify the identity of the user possessing the mobile credential for permitting different modes of operation.

Figure 12A:
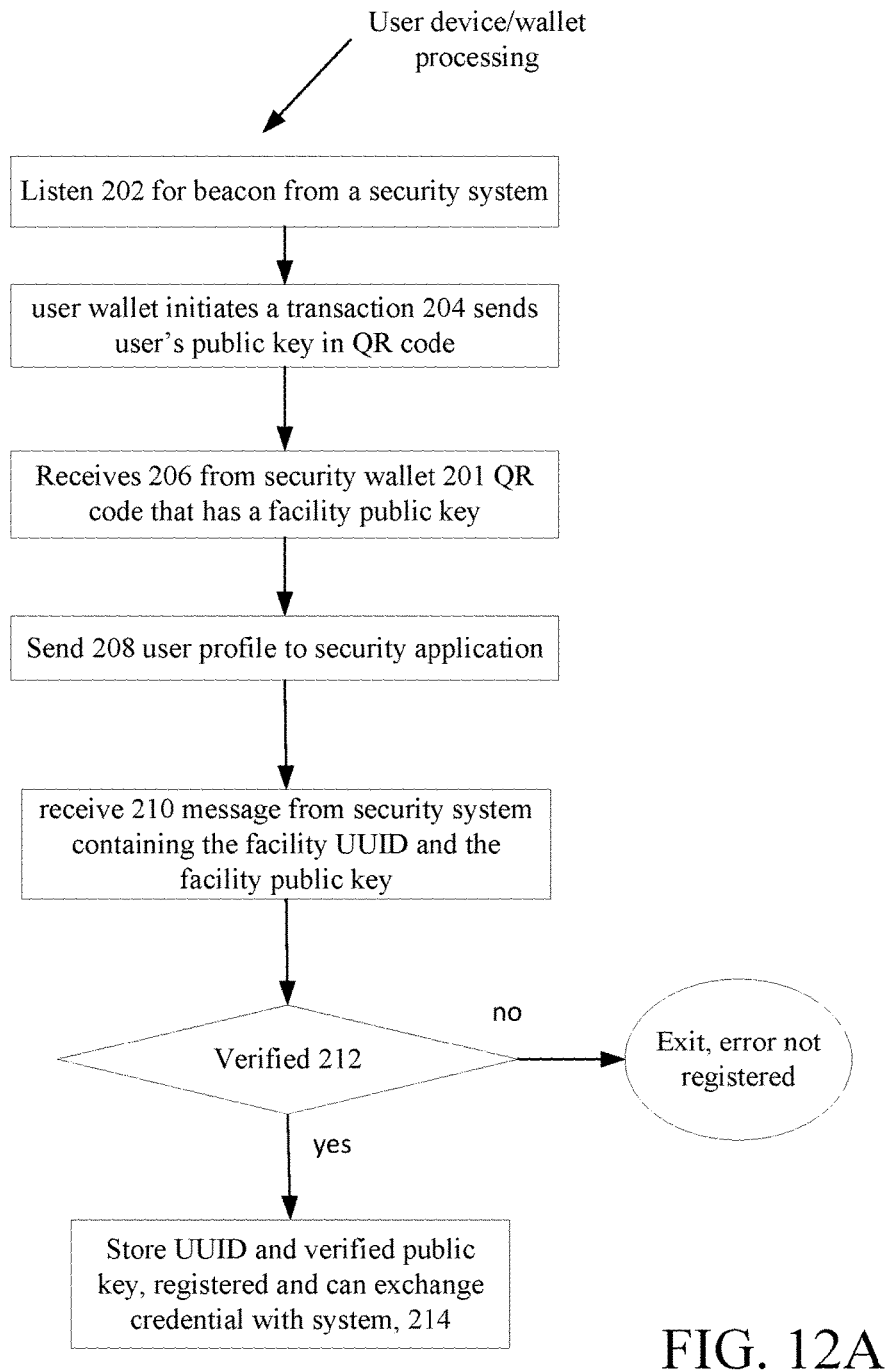
FIGS. 12A-12C and 13A-13C are flow diagrams.

Referring now to FIG. 12A, the user device 12a portion credential-based registration process flow 200 is shown. The user device 12a listens 202 for a beacon from the security system 184. The beacon includes a message to cause the user's device to initiate 204 a transaction with the security system 184 to send the user's public key stored in the user's wallet 13a. The user's public key can be embedded in a code, such as a "QR"™ code (type of matrix barcode) that is stored in the user's wallet 13a. Other approaches could be used.

The user's wallet 13a requests 206 from a security wallet 201 of the security system 184, e.g., security application 188, an access QR code has embedded therein the intrusion detection system 21a public key. In some implementations, the intrusion detection system 21a public key as well as the intrusion detection system 21a UUID (discussed below) are specific to a single physical intrusion detection system 21a. However, in other implementations, the facility public key as well as the facility UUID are specific to a plurality of intrusion detection system 21a of a single or related set of entities. From the wallet 13a, a user profile corresponding the user associated with the device 12a is sent 208 to the security application 188. As used herein a UUID is an identifier, e.g., such as a Universally Unique Identifier (UUID) per the UUID identifier standard that uses a 128-bit value.

Figure 12B:
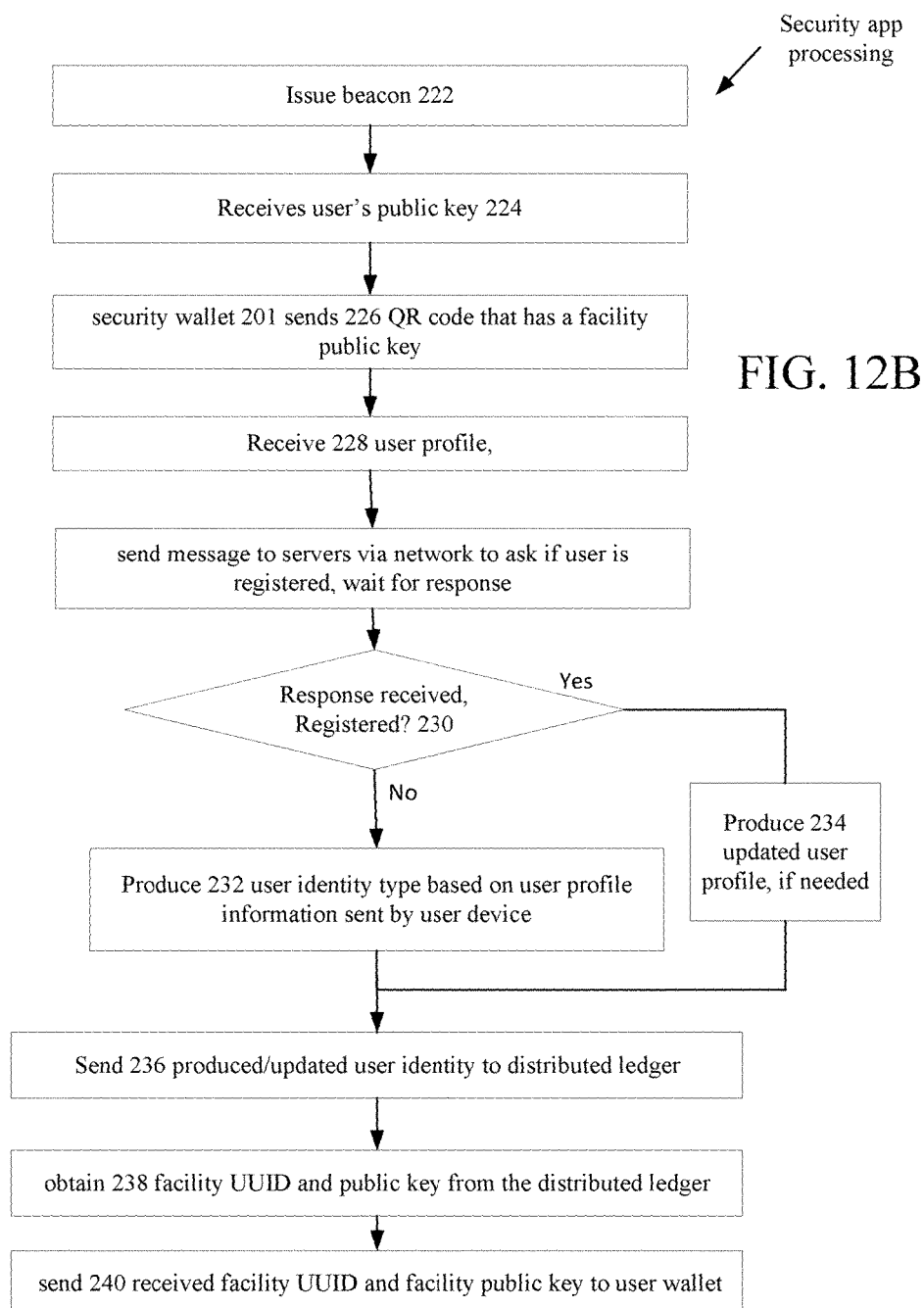

Referring now also to FIG. 12B, the security application 188 causes the security system to continually or periodically issue 222, a beacon, e.g., an electronic signal that is readable by the user device 12*a*. The security application receives 224 the user's public key. A security wallet 201 of the security application sends 226 a QR code that has the intrusion detection system's 21*a* public key. The security application receives 228 the user's profile corresponding the user associated with the device 12*a*. Upon receiving the user profile, the security application 188 sends 228 a message to distributed networked servers to search for the user via the distributed ledger 14. This search would be for the users PII information.

Upon receipt 230 of a search result, if the user does not exist in the distributed ledger system 14, then the system will produce 232 a fault message.

If the user profile does exist it may be updated 234, if needed, based on the received profile information. The security system sends 236 updated user identity to the distributed ledger 14, along with the received public key to the distributed ledger system 14 where the profile, public key of the user are stored and the user has been verified.

Thus, upon verification of the user, the intrusion detection system 21*a* can be assured that it can exchange credentials with the user device 12*a* and wallet 13*a*. The security system via the security application 188 sends 238 a message to the distributed network servers to obtain the intrusion detection system 21*a* UUID and the intrusion detection system 21*a* public key from the distributed ledger 14 and upon receiving the intrusion detection system 21*a* UUID and intrusion detection system 21*a* public key, sends 220 the intrusion detection system 21*a* UUID and the intrusion detection system 21*a* public key to the wallet 13*a* for verification and storage.

The wallet 13*a* receives 210 a message from the security system, which contains the intrusion detection system 21*a* UUID and the intrusion detection system 21*a* public key. The wallet 13*a* verifies 212 the intrusion detection system 21*a* public key using similar processes as discussed above. If verified the user device 12*a* and wallet 13*a* can be assured that this is the intrusion detection system 21*a* for which the user device 12*a* and wallet 13*a* can furnish a mobile credential. When verified the wallet stores 214 the UUID and intrusion detection system 21*a* public key.

Figure 12C:
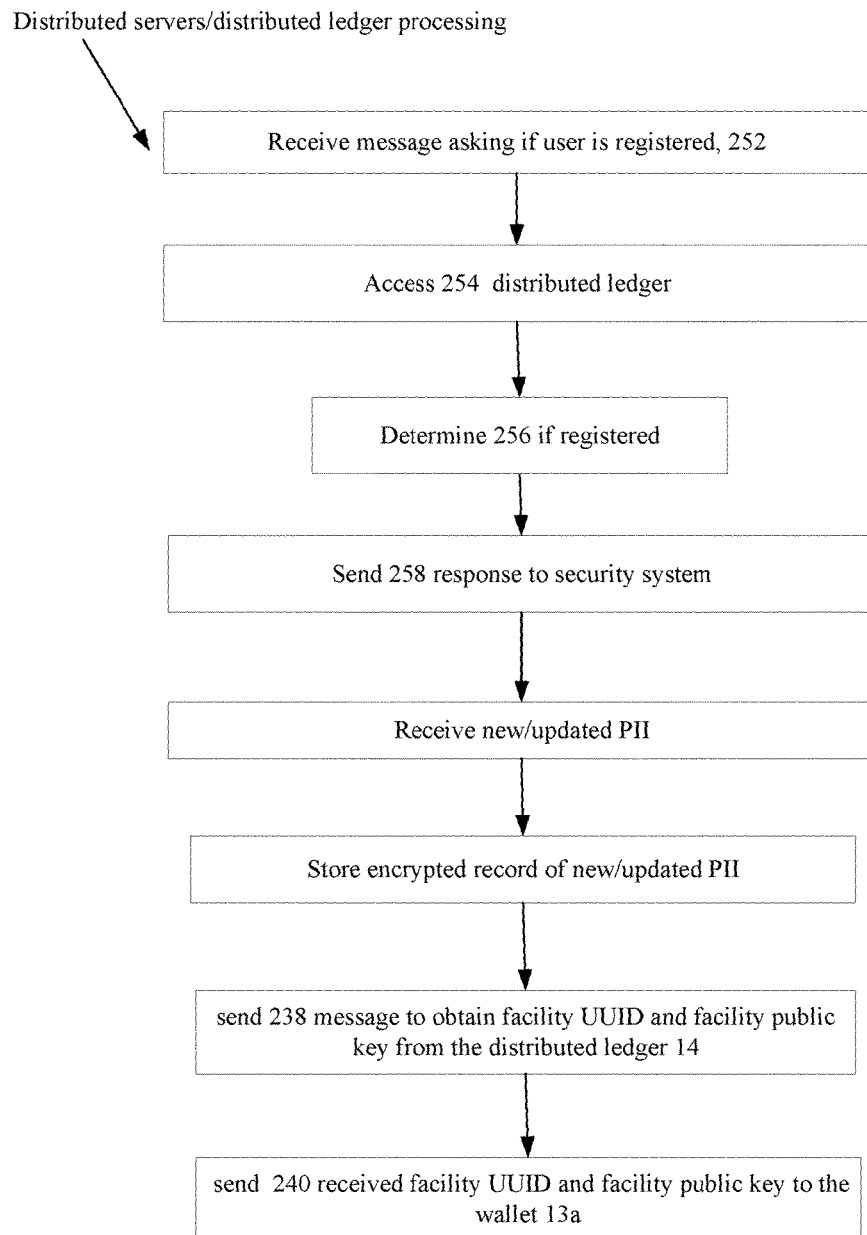

Referring now to FIG. 12C, the distributed servers receive 252 a message from the security system to conduct a search for a profile of the user. The distributed servers access 254 the distributed ledger 14. The distributed servers determine 256 if a profile exists by searching the distributed ledger system 14 for a profile of the user. The distributed servers send 258 a result of the search, e.g., registered, not registered, expired registration, etc. to the intrusion detection system.

Credential-Based Detection

Credential-based detection processing for automatically changing operational modes of the intrusion detection system by virtue of a user possessing a registered mobile credential stored on the user device 12*a* (more specifically in the wallet 13*a*) is shown. The processing uses the user device, intrusion detection system and the distributed system/distributed ledger system. The process uses a credential exchange mechanism that allows a user's wallet 13*a* to verify each intrusion detection system 21*a* under control of an entity that issues its own credentials that can be traced by the intrusion detection system 21*a*, obviating need for a central, certificate issuing authority, by each intrusion detection system 21*a* having a unique certificate similar to those commonly found today in website certificates. However, in this instance, the company is the issuer of the certificate. This gives the ability to have the credential carrier roles and permissions, conveyed by the reader application exchanging the roles and permissions of a user, without having to go back to a central service. This allows local control (exchange process of certificates). The mobile wallet 13*a* can access permissions from central intrusion detection system 21*a* (one time load) without the local control having to go back to central intrusion detection system 21*a* each time access is attempted.

Digital certificates are issued by a certificate authority or certification authority (CA), i.e., an entity that issues and certifies digital certificates, which certification is used to verify the ownership of a public key by the named entity associated with the certificate. The certification enables others that rely upon signatures or assertions made about the private key as corresponding to the certified public key. In this model of trust relationships, a CA could be a third party or in some implementations could be the entity itself rather than a trusted third party—trusted both by the owner of the certificate and by parties that would be relying on the certificate. Public-key infrastructure (PKI) schemes feature certifying authorities.

User detection where the user's device has a seal (discussed below) i.e., a token that is registered on a user' wallet 13*s* verifies that the user has gone through an initial authentication process. This "seal" would contain a signature from the security server 184 that validated the user's wallet under specified conditions (time interval, security level, etc.). The system using a Authenticated Network Architecture provisions the wallet 13*a* to automatically allow intrusion detection system mode modification.

Digital certificates are issued by a certificate authority or certification authority (CA), i.e., an entity that issues and certifies digital certificates, which certification is used to verify the ownership of a public key by the named entity associated with the certificate. The certification enables others that rely upon signatures or assertions made about the private key as corresponding to the certified public key. In this model of trust relationships, a CA could be a third party or in some implementations could be the entity itself rather than a trusted third party—trusted both by the owner of the certificate and by parties that would be relying on the certificate. Public-key infrastructure (PKI) schemes feature certifying authorities.

Described is the intrusion detection system 21*a* security application 188 to verify users detected by the intrusion detection system 21*a*.

The user's device 12*a* listens for a beacon from the security system that the user's device, e.g., smartphone receives and, which the mobile wallet 13*a* detects. The user device 12*a* connects to the system 184, and the wallet 13*a* via the device 12*a* requests that the system 184 provide its credentials to the user device 12*a*. The beacon includes a message to cause the user's device 12*a* to initiate 604 a transaction to connect with the security server/security application. The user's wallet 13*a* requests 606 from a security wallet 601 in the intrusion detection system 21*a*, e.g., security application 188, the intrusion detection system 21*a* certificate, OCSP and intrusion detection system 21*a* UUID (discussed below).

The user's device 12*a* verifies 608 the credentials sent to the wallet 13*a* from the security wallet 201 of the security system 184, e.g., the intrusion detection system 21*a* certificate, the OCSP and the intrusion detection system 21*a* UUID. If valid, then the system will provide its intrusion detection system 21*a* UUID, the intrusion detection system 21*a* certificate (public key for the intrusion detection system 21*a*) as well as the company UUID and company certificate (public key of the company). The wallet 13a verifies if, the wallet 13a, is paired with the company.

Other approaches include the beacon ID being that of the company UUID and if the wallet 13a is paired with that company, the wallet 13a (via the device 12a) then connects and requests details. The wallet 12a via the user's device 12a, either connects and determines if the beacon is from a valid system or the beacon ID itself is formatted such that beacon from a valid system informs the wallet 12a.

The user's wallet connects to the application once the beacon is detected. The application has the intrusion detection system 21a certificate, the intrusion detection system 21a UUID, and a revocation status, e.g., such as via the "Online Certificate Status Protocol" (OCSP) with or without OCSP stapling, as discussed above. Also other approaches could use certificate revocation lists (CRL), as discussed above.

Since the mobile wallet knows the company's public key, the mobile wallet can trust that any packets signed by the company are valid and can be trusted. When the mobile wallet 13a is detected by the intrusion detection system 21a, the intrusion detection system 21a provides its intrusion detection system 21a specific public key to the mobile device 12a (wallet 13a). The mobile wallet 13a does not know if this intrusion detection system 21a is authentic and part of the company that the wallet 13a holds a mobile credential for, and thus before the wallet 13a exchanges its credentials, the wallet 13a needs to verify for certain that the intrusion detection system 21a is authentic.

Authenticity of the intrusion detection system 21a is determined by the wallet 13a through verification 608 of the intrusion detection system 21a's certificate. The verification process has the wallet 13a determine whether the intrusion detection system 21a certificate was signed by the company. If the certificate was signed by the company, then the wallet 13a verifies that the intrusion detection system 21a certificate and the signature match because the wallet has the company's public key and the wallet can verify the signature. If the signature is valid, then the wallet 13a knows that the intrusion detection system 21a certificate is authentic.

Although the certificate is authentic the wallet needs to verify that the certificate has not been revoked. The wallet can do this verification a number of ways, as discussed above.

Upon, the user's wallet 13a verifying the intrusion detection system 21a credentials, e.g., intrusion detection system 21a certificate, a revocation status and intrusion detection system 21a UUID, the user's wallet sends 610 a JWT message to the intrusion detection system 21a. The JWT message follows the so called JSON Web Token (JWT) format that is a JSON-based open standard (RFC 7519) for producing tokens that assert some number of "claims." The generated tokens, as above, are signed by the token producer's private key, so that intrusion detection system 21a app in possession of the producer's public key is able to verify that the token is legitimate. The claims are used to pass identity of authenticated users between an identity provider and a service provider. The tokens can be authenticated and encrypted. Upon verification of the JWT message by the servers, the servers send an status message that is received 612 by the wallet 13a, allowing or denying mode changes by the intrusion detection system 21a. An exemplary JWT message is JWT Format

| Claims | |
|---|---|
| Iss | Issuer. The UUID of the Mobile Wallet |
| Aud | The UUID of the Reader being accessed |
| Exp | Expiration time of the token. Set to 30 seconds |
| Jti | Unique token id. Server will track IDs over the expiration time period to ensure not duplicate JWT calls are made |
| Iat | Time the token was issued/created |

The JWT contains the "iss" attribute which is a unique ID for the wallet. This unique ID is used by the intrusion detection system 21a to obtain the stored public key and the JWT can be verified. If the token is not valid then an error response is sent to the wallet and access is not provided. The JWT has an "aud" attribute that identifies the destination of the token (i.e., the reader UUID). The JWT also includes an "exp" attribute that sets the expiration time of the token, and a "jti" attribute, i.e., and ID that can be used by the reader or which can be used by an upstream system to ensure that the token can be used only once during the validity time (i.e., replays would be prevented). The "iat" attribute indicates the time that the JWT was issued.

Thus, the security application 188 can send to the user device containing the wallet 13a a verified identity of an authorized user detected by the intrusion detection system 21a or an error depending on the outcome of the process. All exchanges are logged in the distributed ledger for audit tracking, etc.

Figure 13A:
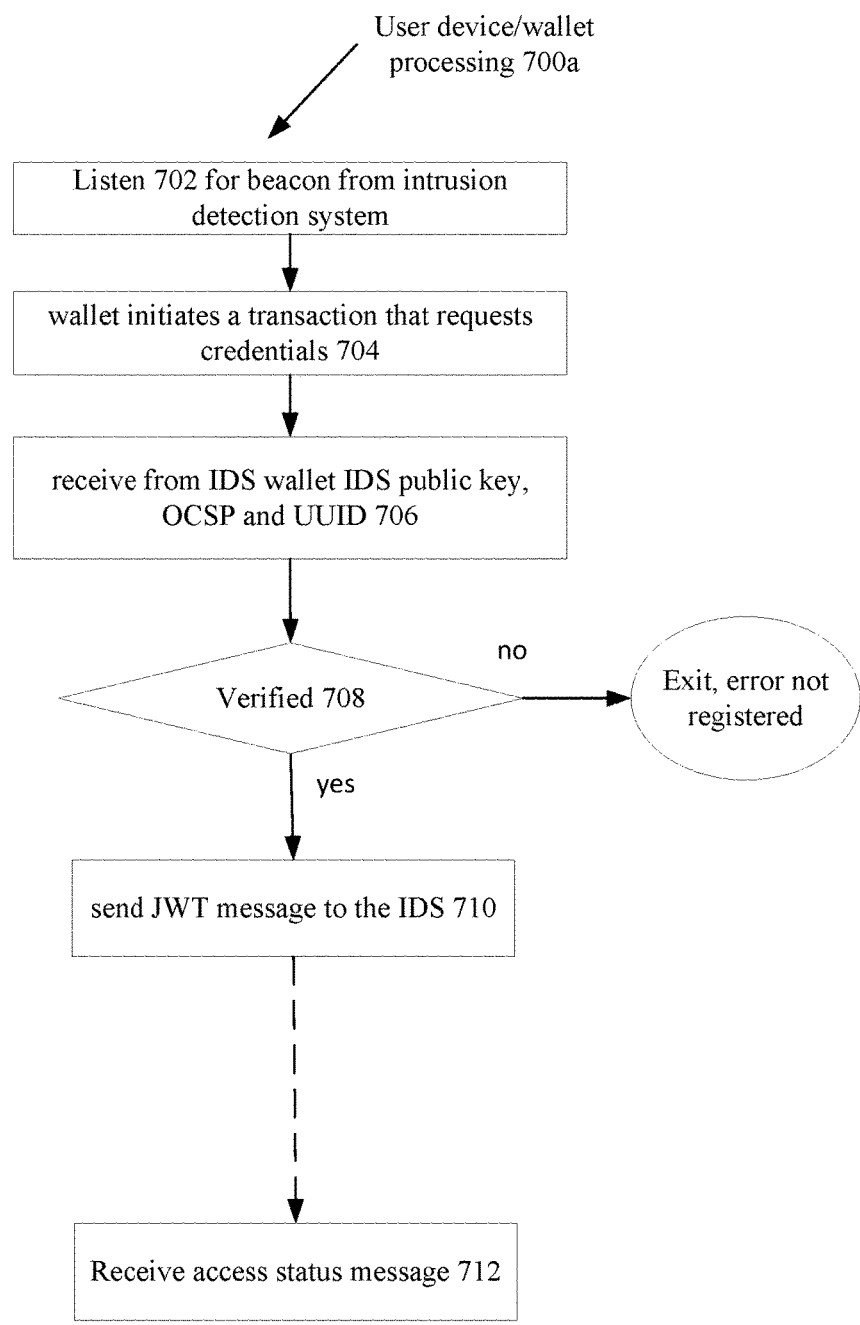

Referring now to FIG. 13A, the user device 12a portion 700a of the credential-based access process 700 is shown. The user device 12a listens 702 for the beacon. The user device 12a connects intrusion detection system 21a, and the wallet 13a via the device 12a requests that the intrusion detection system 21a provides its credentials to the user's device 12a. The user's wallet 13a requests 706 from a security wallet 701 in the intrusion detection system 21a, e.g., security application 188, the intrusion detection system 21a certificate, OCSP and intrusion detection system 21a UUID (discussed below).

The user's device 12a verifies 708 the credentials sent to the wallet 13a from the security wallet 701 of the security system 184, e.g., the intrusion detection system 21a certificate, the OCSP and the intrusion detection system 21a UUID. If the card reader is valid, then the card reader will provide its intrusion detection system 21a UUID, the intrusion detection system 21a certificate (public key for the intrusion detection system 21a) as well as the company UUID and company certificate (public key of the company). The wallet 13a verifies if, the wallet 13a, is paired with the correct intrusion detection system 21a.

Other approaches include the beacon ID being that of the company UUID and if the wallet 13a is paired with that company, the wallet 13a (via the device 12a) then connects to the intrusion detection system 21a and requests details. The wallet 12a via the user's device 12a, either connects and determines if the beacon is from a valid system or the beacon ID itself is formatted such that beacon from a valid system informs the wallet 12a. The user's wallet connects to the application once the beacon is detected. The application has the intrusion detection system 21a certificate, the intrusion detection system 21a UUID, and a revocation status, e.g., such as via the "Online Certificate Status Protocol" (OCSP) as discussed above. Other approaches could be used.

Since the mobile wallet knows the company's public key, the mobile wallet can trust that any packets signed by the company are valid and can be trusted. When the mobile wallet 13a accesses the reader, the reader provides its intrusion detection system 21a specific public key to the mobile device 12a (wallet 13a). The mobile wallet 13a does not know if this intrusion detection system 21a is authentic and part of the company that the wallet 13a holds a mobile credential for, and thus before the wallet 13a exchanges its credentials, the wallet 13a needs to verify for certain that the reader is authentic.

Authenticity of the reader is determined by the wallet 13a through verification 708 of the intrusion detection system 21a's certificate. The verification process has the wallet 13a determine whether the intrusion detection system 21a certificate was signed by the company. If the certificate was signed by the company, then the wallet 13a verifies that the intrusion detection system 21a certificate and the signature match because the wallet has the company's public key and the wallet can verify the signature. If the signature is valid, then the wallet 13a knows that the intrusion detection system 21a certificate is authentic.

Although the certificate is authentic the wallet needs to verify that the certificate has not been revoked. The wallet can do this verification a number of ways as discussed above, e.g. directly through an OCSP request or with an OCSP response (i.e. OCSP stapling), as discussed above, or CRL.

Upon, the user's wallet 13a verifying the intrusion detection system 21a credentials, e.g., intrusion detection system 21a certificate, a revocation status and intrusion detection system 21a UUID, the user's wallet sends 710 a JWT message to intrusion detection system 21a. The JWT message follows the so called JSON Web Token (JWT) format discussed above. The generated tokens, as above, are signed by the token producer's private key, so that intrusion detection system 21a in possession of the producer's public key is able to verify that the token is legitimate. The claims are used to pass identity of authenticated users between an identity provider and a service provider. The tokens can be authenticated and encrypted. Upon verification of the JWT message by the servers, the servers cause the reader to send an access status message that is received 712 by the wallet 13a, allowing or denying access.

Figure 13B:
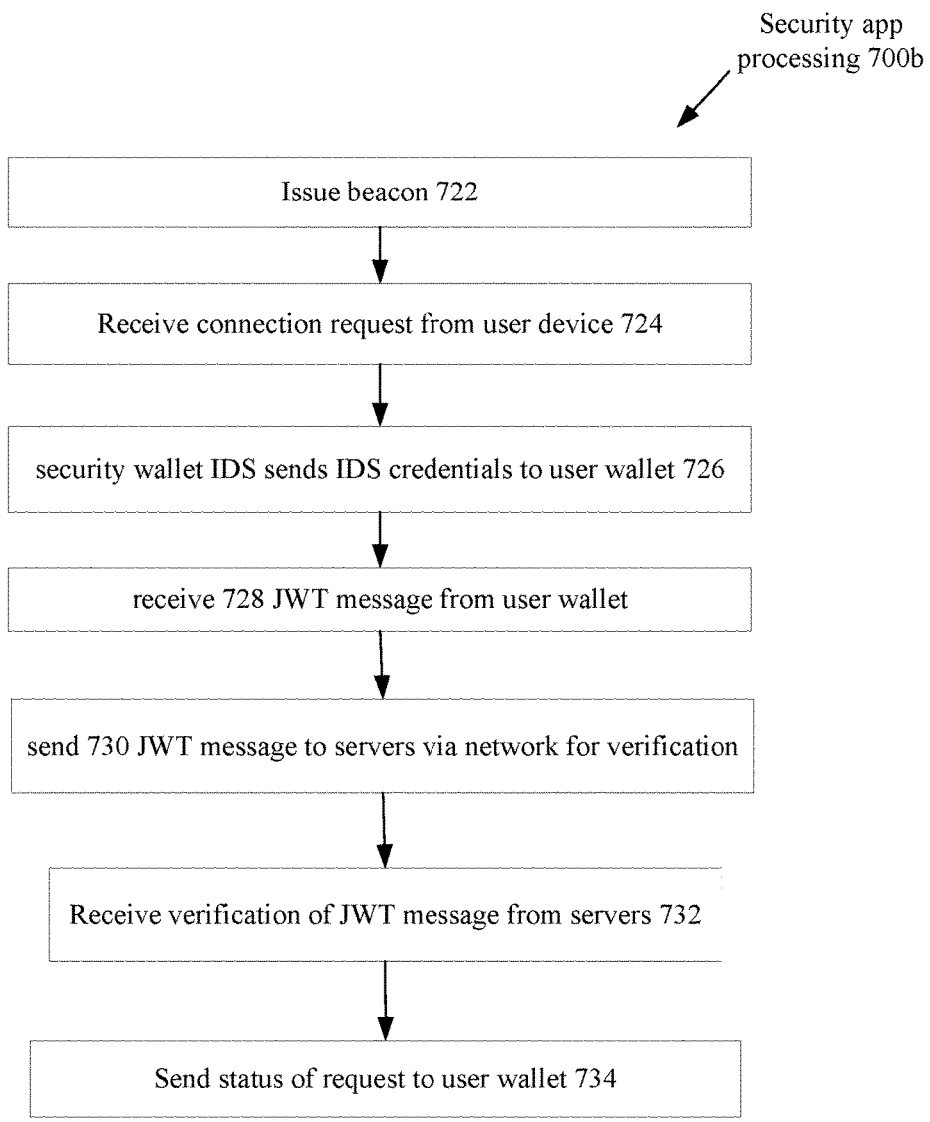

Referring now also to FIG. 13B, the security application 188 processing 700b causes the security system 184 to continually or periodically issue 722, the beacon that is readable by the user device 12a and which causes the user device to request 724 a connection to the system 184 e.g., the intrusion detection system 21a. As mentioned above, the user device 12a upon connecting provides 726 its credentials to the user's device 12a (wallet 13a). If the verification by the wallet was successful, the wallet sends the JWT message, and upon receipt 728 of the JWT message, the JWT is sent 730 to the distributed network to a server that is used to verify the JWT token. Upon verification of the JWT message by the servers, the servers send the reader an access status message that is received 732 and is sent 734 to the wallet 13a allowing or denying mode changes to the intrusion detection system 21a.

Figure 13C:
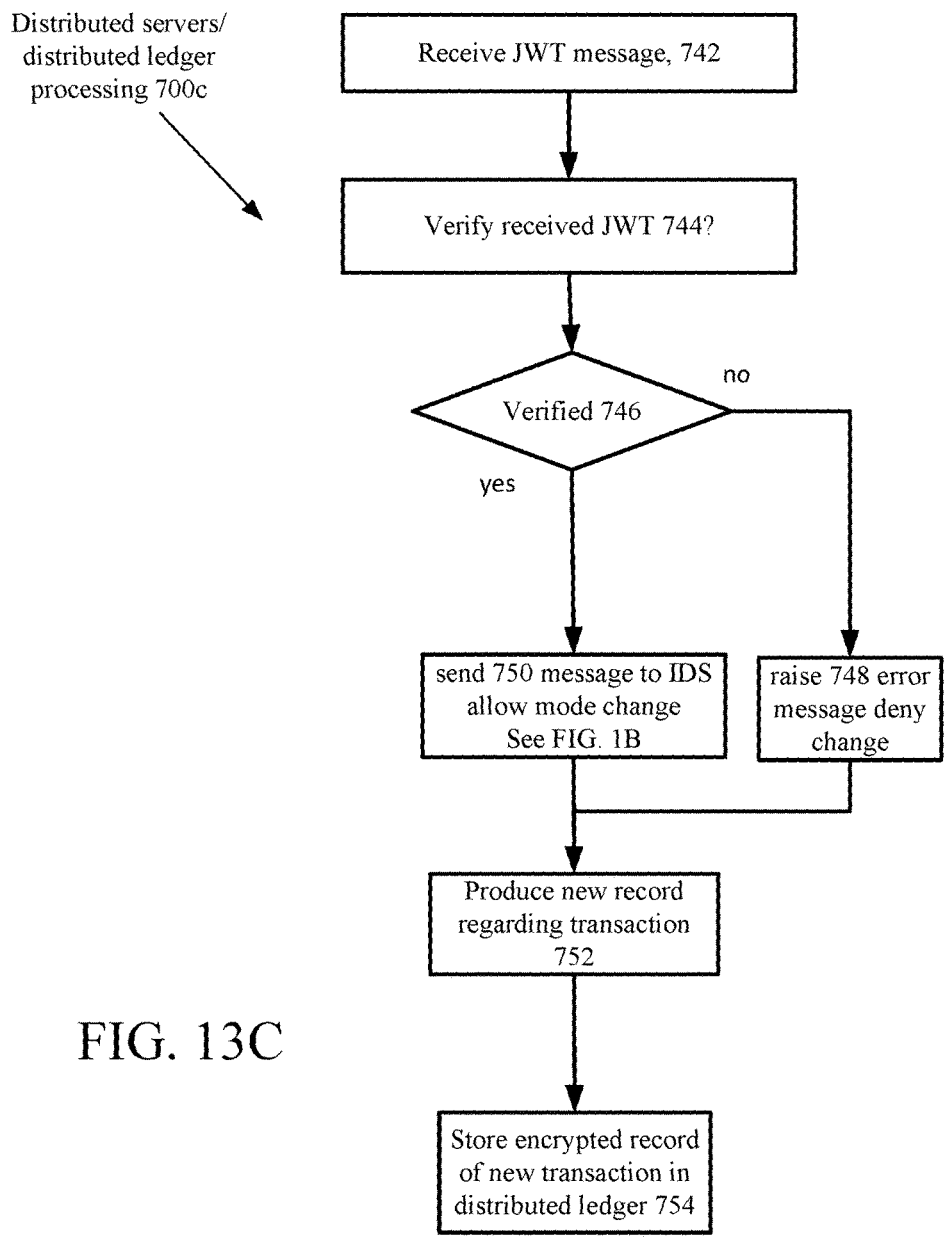

Referring now also to FIG. 13C, the distributed servers/distributed ledger processing 700c is shown. The JWT is received 742 by the distributed servers and is verified 744. If the JWT is not verified, an error is raised 748 (see below). If the JWT is verified, 746 the mode of operation of the intrusion detection system 21a is changed according to the user 750. In addition, whether the JWT is verified or not verified, a corresponding entry record of either an access entry or an access denied entry is produced 752 as an access log that is stored 754 and maintained in the distributed ledger system.

Figure 14:
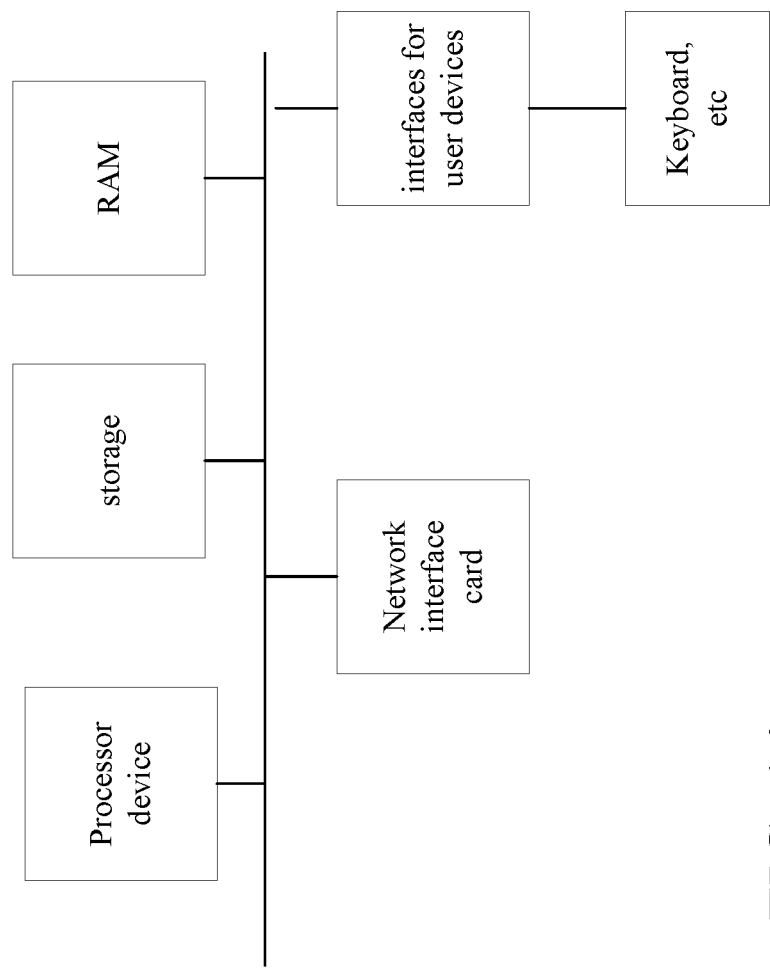
FIG. 14 is a block diagram of an exemplary device/system.

Referring now to FIG. 14, components of system/devices are shown. Memory stores program instructions and data used by the processor. The memory may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Servers are associated with an IP address and port(s) by which it communicates with user devices. The server address may be static, and thus always identify a particular one of monitoring server to the intrusion detection panels. Alternatively, dynamic addresses could be used, and associated with static domain names, resolved through a domain name service. The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Computer program products are stored in a tangible form on non-transitory computer readable media and non-transitory physical hardware storage devices that are suitable for embodying computer program instructions and data. These include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory and other non-transitory devices.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method comprising:
   storing one or more data structures defining a plurality of system modes of an intrusion detection system, each of the plurality of system modes associated with an identity of one of a plurality of users, wherein the one or more data structures are a set of rules, wherein each rule of the set of rules comprises one or more parameters for an identity variable, a security component variable, an action variable associated with the security component variable, and a security level variable;
   configuring the intrusion detection system, by:
     receiving from a user device, a set of identity credentials;
     sending the set of identity credentials to an identity service to verify an identity of one user of the plurality of users associated with the set of identity credentials; and
     receiving a result of a verification of the identity; and when verified:
       selecting one system mode of the plurality of system modes based on the identity of the one user and the one or more data structures; and
       configuring the intrusion detection system to operate based on the one system mode.

2. The method of claim 1 wherein subsequent to receiving the set of identity credentials,
   receiving additional identification information via at least one of a credential reader or the user device, wherein the user device runs an identity wallet application, where the intrusion detection system processes the additional identification information as originating from a trusted source based on having received the result of the verification of the identity indicating the set of identity credentials are verified.

3. The method of claim 2 wherein the additional identification information is biometric information that the intrusion detection system processes to verify the one user in possession of the user device.

4. The method of claim 2 wherein the additional identification information is previously verified by the identity service and is registered mobile credential information stored on the user device.

5. The method of claim 1, wherein the set of identity credentials are proxies for identity attributes associated with the identity of the one user.

6. A system comprises:
   a processor and memory, wherein the memory is configured to store one or more data structures defining a plurality of system modes for an intrusion detection system, each of the plurality of system modes associated with one identity of one of a plurality of users, wherein the one or more data structures are a set of rules, wherein each rule of the set of rules comprises one or more parameters for an identity variable, a security component variable, an action variable associated with the security component variable, and a security level variable, wherein the processor and the memory configure the intrusion detection system, by instructions to cause the system to:
   receive from a user device, a set of identity credentials;
   send the set of identity credentials to an identity service to verify an identity of one user of the plurality of users associated with the set of identity credentials; and
   receive a result of a verification of the identity; and when verified:
     select one system mode of the plurality of system modes based on the identity and the one or more data structures; and
     configure the intrusion detection system to operate based on the one system mode.

7. The system of claim 6 wherein the system is part of the intrusion detection system.

8. A system comprising:
   one or more memory devices configured to store one or more data structures defining a plurality of system modes of an intrusion detection system, each of the plurality of system modes associated with an identity of one of a plurality of users, wherein the one or more data structures are a set of rules, wherein each rule of the set of rules comprises one or more parameters for an identity variable, a security component variable, an action variable associated with the security component variable, and a security level variable, wherein the one or more memory devices are configured to store instructions that, when executed by one or more processors, cause the one or more processors to configure the intrusion detection system by:
   receiving from a user device, a set of identity credentials;
   sending the set of identity credentials to an identity service to verify an identity of one user of the plurality of users associated with the set of identity credentials; and
   receiving a result of a verification of the identity; and when verified:
     select one system mode of the plurality of system modes based on the identity and the one or more data structures; and
     configure the intrusion detection system to operate based on the one system mode.

9. A computer program product stored on a non-transitory computer readable media comprising instructions to cause a system to:

store one or more data structures defining a plurality of system modes of an intrusion detection system, each of the plurality of system modes associated with an identity of one of a plurality of users, wherein the one or more data structures are a set of rules, wherein each rule of the set of rules comprises an identity parameter, a security component parameter, an action parameter associated with the security component parameter, and a security level parameter;

receive from a user device, a set of identity credentials;

send the set of identity credentials to an identity service to verify an identity of one user of the plurality of users associated with the set of identity credentials; and receive a result of a verification of the identity; and when verified:

select one system mode of the plurality of system modes based on the identity of the one user and the one or more data structures; and configure the intrusion detection system to operate based on the one system mode.

10. The computer program product of claim 9 wherein subsequent to a reception of the set of identity credentials, the instructions cause the system to receive additional identification information via at least one of the user device, wherein the user device runs an identity wallet application or a credential reader, where the intrusion detection system processes the additional identification information as originating from a trusted source based on having received the result of the verification of the identity indicating the set of identity credentials are verified.

11. The computer program product of claim 10 wherein the additional identification information is biometric information that the intrusion detection system processes to verify the one user in possession of the user device.

12. The computer program product of claim 10 wherein the set of identity credentials were previously verified by the identity service and is a registered mobile credential stored on the user device.

13. The computer program product of claim 9, wherein the set of identity credentials are proxies for identity attributes associated with the identity of the one user.

14. The system of claim 8 wherein subsequent to a reception of the set of identity credentials, receiving additional identification information via at least one of a credential reader or the user device, wherein the user device runs an identity wallet application, where the intrusion detection system processes the additional identification information as originating from a trusted source based on having received the result of the verification of the identity presented to the intrusion detection system.

15. The system of claim 14 wherein the additional identification information is biometric information that the intrusion detection system processes to verify the one user in possession of the user device.

16. The system of claim 14 wherein the set of identity credentials were previously verified by the identity service and is a registered mobile credential stored on the user device.

17. The system of claim 8, wherein the set of identity credentials are proxies for identity attributes associated with the identity of the one user.

\* \* \* \* \*